United States Patent
Mou et al.

(10) Patent No.: US 12,488,411 B2
(45) Date of Patent: Dec. 2, 2025

(54) METHODS AND CONTROL SYSTEMS THAT USE DIMENSIONAL-TRANSFORM-BASED THREE-DIMENSIONAL SEARCHING AND VOXEL MAPPING

(71) Applicants: Zhijing George Mou, Seattle, WA (US); Qingqing Xiao, Seattle, WA (US)

(72) Inventors: Zhijing George Mou, Seattle, WA (US); Qingqing Xiao, Seattle, WA (US)

( * ) Notice: Subject to any disclaimer, the term of this patent is extended or adjusted under 35 U.S.C. 154(b) by 274 days.

(21) Appl. No.: 18/207,067

(22) Filed: Jun. 7, 2023

(65) Prior Publication Data
US 2023/0351547 A1 Nov. 2, 2023

Related U.S. Application Data

(63) Continuation-in-part of application No. 16/807,494, filed on Mar. 3, 2020, now Pat. No. 11,710,211, which is a continuation-in-part of application No. 15/940,789, filed on Mar. 29, 2018, now Pat. No. 10,580,114.

(60) Provisional application No. 62/478,442, filed on Mar. 29, 2017.

(51) Int. Cl.
*G06T 3/06* (2024.01)
*G06T 7/73* (2017.01)
*G06T 17/00* (2006.01)

(52) U.S. Cl.
CPC .............. *G06T 3/06* (2024.01); *G06T 7/75* (2017.01); *G06T 17/005* (2013.01)

(58) Field of Classification Search
None
See application file for complete search history.

(56) References Cited

U.S. PATENT DOCUMENTS

2010/0174721 A1* 7/2010 Mou .................. G06F 16/2448
707/769

* cited by examiner

*Primary Examiner* — Nurun Flora
(74) *Attorney, Agent, or Firm* — OPWII, LLC

(57) ABSTRACT

The current document is directed to systems and methods that incorporate a dimensional transform that maps a 3D space to a one-dimensional space with an implicit recursive hierarchical structure that preserves 3D neighborhoods. A regional or neighborhood search for points in a 3D subspace is reduced, by the dimensional transform, to one or more searches in the transformed 1D space. The search is performed by either recursive decomposition of the 3D space indexed by the transform into subspaces, exploiting the transformed space structure, or by direct indexing into the region of interest. Performance of the control systems and methods is further enhanced by incorporating one or more black-white arrays, which support-searches over one-dimensional spaces as well as dynamic 3D spaces. Dimensional-transform-based methods also provide for point-cloud voxelization and voxel map operations.

32 Claims, 11 Drawing Sheets

A White-Black Array with R=4, N=16,

| rank: | 3 | | | | | | | 2 | | | | 1 | | 0 | |
|---|---|---|---|---|---|---|---|---|---|---|---|---|---|---|---|
| WHITE | | | | | | | | 83 | 67 | 59 | 21 | 76 | 33 | 45 | ✕ |
| BLACK | | | | | | | | | | | | | | 52 | ✕ |
| index: | 15 | 14 | 13 | 12 | 11 | 10 | 9 | 8 | 7 | 6 | 5 | 4 | 3 | 2 | 1 | 0 |

(a) Insert 52 into $Seg^b(0)$ for $Seg^w(0)$ is occupied — 901

| rank: | 3 | | | | | | | 2 | | | | 1 | | 0 | |
|---|---|---|---|---|---|---|---|---|---|---|---|---|---|---|---|
| WHITE | | | | | | | | 83 | 67 | 59 | 21 | 76 | 33 | ~~45~~ | ✕ |
| BLACK | | | | | | | | | | | | | | ~~52~~ | ✕ |
| index: | 15 | 14 | 13 | 12 | 11 | 10 | 9 | 8 | 7 | 6 | 5 | 4 | 3 | 2 | 1 | 0 |

(b) Merge of $Seg^w(0)$ and $Seg^b(0)$ ⇒ $Seg^b(1)$ — 902

| rank: | 3 | | | | | | | 2 | | | | 1 | | 0 | |
|---|---|---|---|---|---|---|---|---|---|---|---|---|---|---|---|
| WHITE | | | | | | | | 83 | 67 | 59 | 21 | ~~76~~ | ~~33~~ | ~~45~~ | ✕ |
| BLACK | | | | | | | | 76 | 52 | 45 | 33 | ~~52~~ | ~~45~~ | ~~52~~ | ✕ |
| index: | 15 | 14 | 13 | 12 | 11 | 10 | 9 | 8 | 7 | 6 | 5 | 4 | 3 | 2 | 1 | 0 |

— 903

(c) Merge of $Seg^w(1)$ and $Seg^b(1)$ ⇒ $Seg^b(2)$

| rank: | 3 | | | | | | | 2 | | | | 1 | | 0 | |
|---|---|---|---|---|---|---|---|---|---|---|---|---|---|---|---|
| WHITE | | | | | | | | ~~83~~ | ~~67~~ | ~~59~~ | ~~21~~ | ~~76~~ | ~~33~~ | ~~45~~ | ✕ |
| BLACK | | | | | 904 | | | ~~76~~ | ~~52~~ | ~~45~~ | ~~33~~ | ~~52~~ | ~~45~~ | ~~52~~ | ✕ |
| index: | 15 | 14 | 13 | 12 | 11 | 10 | 9 | 8 | 7 | 6 | 5 | 4 | 3 | 2 | 1 | 0 |

(d) Merge of $Seg^w(2)$ and $Seg^b(2)$ ⇒ $Seg^b(3)$

FIG. 9

| rank: | | | 3 | | | | | | | 2 | | | 1 | | 0 | |
|---|---|---|---|---|---|---|---|---|---|---|---|---|---|---|---|---|
| WHITE | 83 | Φ | 67 | 59 | 52 | Φ | Φ | 6 | 91 | Φ | 77 | 21 | 82 | 45 | | ⊠ |
| BLACK | | | | | | | | | ▓ | ▓ | ▓ | ▓ | ▓ | ▓ | ▓ | ⊠ |
| index: | 15 | 14 | 13 | 12 | 11 | 10 | 9 | 8 | 7 | 6 | 5 | 4 | 3 | 2 | 1 | 0 |

(a) A BWA with some VOID (Φ) values from deletions

| rank: | | | 3 | | | | | | | 2 | | | 1 | | 0 | |
|---|---|---|---|---|---|---|---|---|---|---|---|---|---|---|---|---|
| WHITE | 83 | Φ | 67 | Φ | 52 | Φ | Φ | 6 | 91 | Φ | 77 | 21 | 82 | 45 | | ⊠ |
| BLACK | | | | | | | | | ▓ | ▓ | ▓ | ▓ | ▓ | ▓ | ▓ | ⊠ |
| index: | 15 | 14 | 13 | 12 | 11 | 10 | 9 | 8 | 7 | 6 | 5 | 4 | 3 | 2 | 1 | 0 |

(b) 59 is deleted and replaced by VOID (Φ) at W[12]

| rank: | | | 3 | | | | | | | 2 | | | 1 | | 0 | |
|---|---|---|---|---|---|---|---|---|---|---|---|---|---|---|---|---|
| WHITE | | | | | | | | | 91 | Φ | 77 | 21 | 82 | 45 | | ⊠ |
| BLACK | | | | | | | | | 83 | 67 | 52 | 6 | ▓ | ▓ | ▓ | ⊠ |
| index: | 15 | 14 | 13 | 12 | 11 | 10 | 9 | 8 | 7 | 6 | 5 | 4 | 3 | 2 | 1 | 0 |

(c) Seg(3) was demoted for its occupancy rate reached 50%

| rank: | | | 3 | | | | | | | 2 | | | 1 | | 0 | |
|---|---|---|---|---|---|---|---|---|---|---|---|---|---|---|---|---|
| WHITE | | Φ | 91 | 83 | 77 | 67 | 52 | 21 | 6 | | | | 82 | 45 | | ⊠ |
| BLACK | | | | | | | | | ▓ | ▓ | ▓ | ▓ | ▓ | ▓ | ▓ | ⊠ |
| index: | 15 | 14 | 13 | 12 | 11 | 10 | 9 | 8 | 7 | 6 | 5 | 4 | 3 | 2 | 1 | 0 |

(d) After a merge at rank 2, the delete is completed

FIG. 10

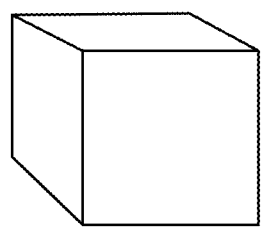
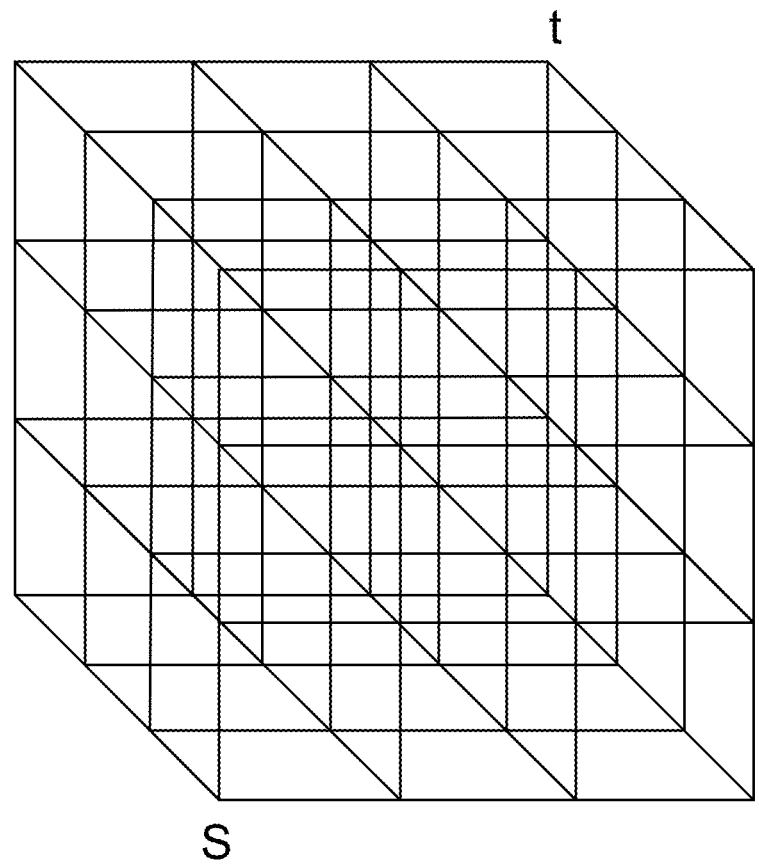
FIG. 11

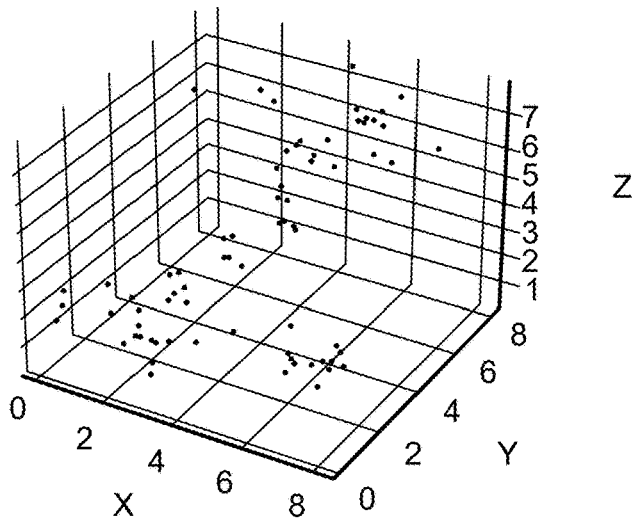
(a) The point cloud
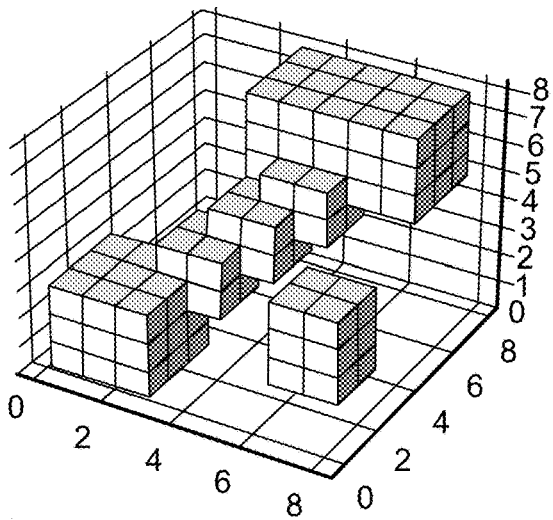
(b) After Voxelization
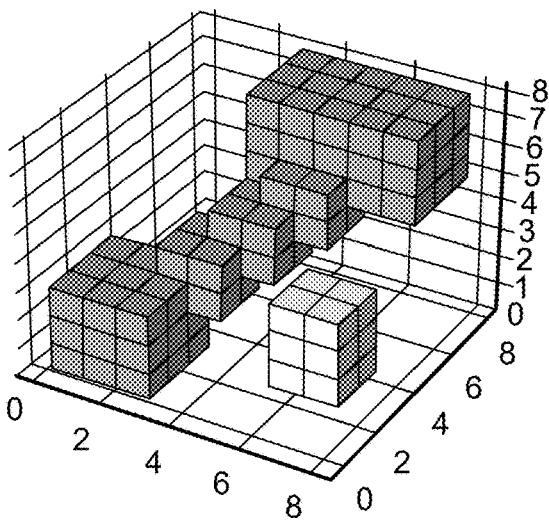
(c) Two objects by segmentation (black and white)
FIG. 12

METHODS AND CONTROL SYSTEMS THAT USE DIMENSIONAL-TRANSFORM-BASED THREE-DIMENSIONAL SEARCHING AND VOXEL MAPPING

CROSS-REFERENCE TO RELATED APPLICATIONS

This application is a continuation-in-part of application Ser. No. 16/807,494, filed Mar. 3, 2020, which is a continuation-in-part of U.S. Pat. No. 10,580,114, issued Mar. 3, 2020, which claims the benefit of Provisional Application No. 62/478,422, filed Mar. 29, 2017.

TECHNICAL FIELD

The current document is directed to methods and control systems that receive three-dimensional data and use the three-dimensional data to characterize an environment and, in particular, to efficient three-dimensional searching and voxel-mapping methods, based on dimensional transforms, incorporated into the methods and control systems.

BACKGROUND

A point cloud is a 3D data set collected by various sensors, such as light detection-and-ranging "LIDAR" sensors, depth cameras, and others. Point cloud registration iteratively aligns a new frame of a 3D data set with previously aligned frames. Aligned 3D-data-set frames are referred to as a "map." In many applications, a sensor moves in a 3D space with six degrees of freedom and each new frame relates to a previous frame or to a set of aligned previous frames by a spatial transformation. The registration of a sequence of frames of a 3D data set is a process that involves finding the rigid transformations, consisting of translations and rotations, that align the frames in a selected coordinate system.

Point-cloud registration has a broad range of applications in areas including computer vision, simultaneous localization and mapping ("SLAM"), robot-path planning, autonomous driving, object recognition, medical imaging, magnetic-resonance imaging, virtual and augmented reality, and 3D model construction in remote sensing. Many new applications have become possible, in recent years, due to rapid advances in sensing and computing technologies, as a result of which 3D data-set registration is becoming an increasingly significant component within many scientific, technological, and commercial applications and fields.

Iterative Closest Point ("ICP") and Generalized Iterative Closest Point ("GICP") are widely adopted approaches for point-cloud registration. As suggested by its name, ICP depends on iterative searching of 3D spaces and, indeed, its performance is dominated by the cost of such searches. K-d trees and other tree-based approaches are used to search for closest points and these tree-based approaches involve expensive tree traversals and re-balancing. Empirical testing has shown that it is unrealistic to perform real-time point-cloud registration with any known tree-based approach to 3D space searching in order to meet a desired precision.

A point-cloud frame is generally compressed by sampling to reduce its cardinality prior to frame alignment in order to decrease processing costs. To ensure that the compression does not result in significant decrease in accuracy, many compression techniques are designed to ensure that each 3D voxel contains only up to a threshold number of data points by removing data points from those 3D voxels with more than the threshold number of data points. Octree has been suggested and used for these compression techniques. Octree uses a storage space of a size proportional to the product of the ranges of the spatial coordinates in each of the three dimensions and employs processing times proportional to the logarithm of the size of the octree for each point examined. The aligned point-cloud frames, or map, produced by point-cloud registration are stored in a data repository. The data repository is incrementally built up along with the processing of each new frame, and, at the same time, is searched repeatedly for certain points in each frame.

The computational efficiency of a method or subsystem within a computer system, measured by the number of instructions processed and the amount of memory used to carry out particular tasks, is directly related to thermodynamic efficiency of the computer system, and is a significant real-word, physical characteristic of electromechanical computing systems. The time efficiency of a method or subsystem within a computer system is directly related to the real-world performance of the physical computer system and is often a significant determinant of the practical utility of the computer system in real-world applications. As with any significant component of an application, technology, or system, researchers, designers, developers, manufacturers, and vendors continuously seek more efficient and faster 3D-data-set-registration methods and systems, and seek improved efficiencies in many other, related applications and problem domains that carry out 3D-data searches.

SUMMARY

The current document is directed to systems and methods that incorporate a dimensional transform that maps a 3D space to a one-dimensional space with an implicit recursive hierarchical structure that preserves 3D neighborhoods. A regional or neighborhood search for points in a 3D subspace is reduced, by the dimensional transform, to one or more searches in the transformed 1D space. The search is performed by either recursive decomposition of the 3D space indexed by the transform into subspaces, exploiting the transformed space structure, or by direct indexing into the region of interest. Performance of the control systems and methods is further enhanced by incorporating one or more black-white arrays, which support-searches over one-dimensional spaces as well as dynamic 3D spaces. Dimensional-transform-based methods also provide for point-cloud voxelization and voxel map operations.

BRIEF DESCRIPTION OF THE DRAWINGS

FIG. 9 illustrates an insert operation that inserts a value into a BWA.

FIG. 10 illustrates a delete operation that removes a value from a BWA.

FIG. 11 illustrates the 26 neighborhoods of a voxel in a voxel map.

FIG. 12 shows a raw point cloud, the constructed voxel map from the raw point cloud, and the result of point-cloud segmentation using DST-based voxelization operations.

DETAILED DESCRIPTION

Computer Systems

Figure 1:
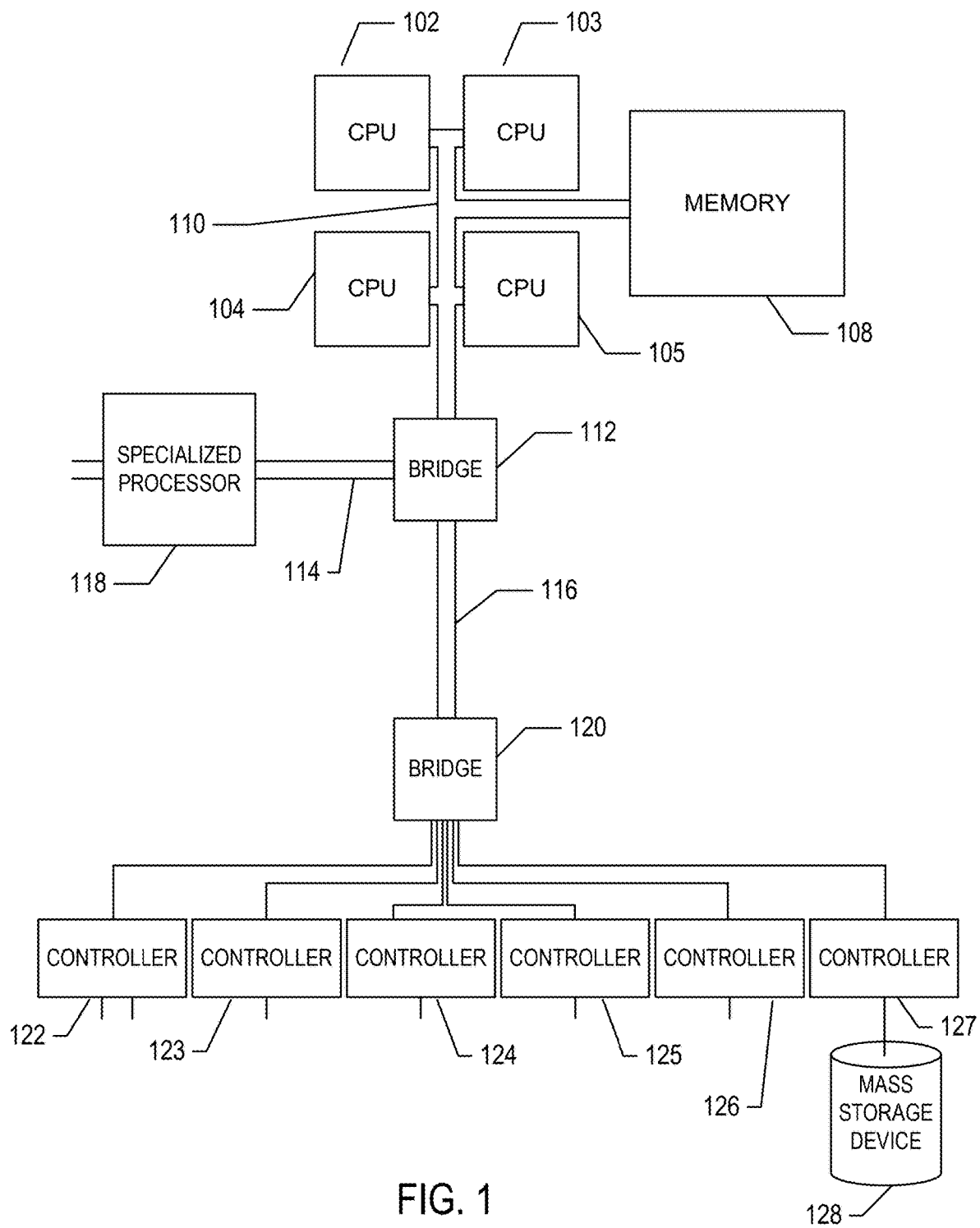
FIG. 1 provides a general architectural diagram for various types of computers.

FIG. 1 provides a general architectural diagram for various types of computers, including certain of the computer systems on which point-cloud-registration systems are implemented. The computer system contains one or multiple central processing units ("CPUs") 102-105, one or more electronic memories 108 interconnected with the CPUs by a CPU/memory-subsystem bus 110 or multiple buses, a first bridge 112 that interconnects the CPU/memory-subsystem bus 110 with additional buses 114 and 116, or other types of high-speed interconnection media. including multiple, high-speed serial interconnects. These buses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. Computer systems, and higher-level systems implemented using them, are physical electro-mechanical systems that consume energy and transform the physical states of many subcomponents and external systems to which they are connected. Computer systems are controlled by computer instructions stored in physical data-storage devices. The computer instructions are themselves physical entities. Otherwise, they could not be stored and retrieved from data-storage devices. Furthermore, mass-storage devices store data for subsequent retrieval and therefore do not encompass electromagnetic waves and other data-transmission media which are not devices and which do not store data for subsequent retrieval.

Notational Conventions and Primitive Objects and Operations

A point p in a discrete 3D space ($D^3$) can be represented by a tuple of three coordinates (z, y, x), where z, y, x are nonnegative integers and are each referred to as a coordinate of point p along a corresponding coordinate axis, Z, Y, or X. of the 3D space. A point in a 1D space is represented by a single nonnegative coordinate k along a single axis of the 1D space. The Euclidean metric for distance is assumed for the space unless otherwise specified, although certain of the following discussions may be valid for additional distance metrics, such as the Manhattan distance metric.

Let $p_1=(z_1, y_1, x_1)$ and $p_2=(z_2, y_2, x_2)$ be two points in $D^3$. These two points define a regular region, denoted by $<p_1, p_2>$ with a cubic shape:

$<p_1,p_2>=\{p=(z,y,x)|\min(z_1,z_2) \leq z \leq \max(z_1,z_2);$ $\min(y_1,y_2) \leq y \leq \max(y_1,y_2);$ $\min(x_1,x_2) \leq x \leq \max(x_1,x_2)\}.$ Note that when one, two, or three of the conditions $z_1 \neq z_2$, $y_1 \neq y_2$, and $x_1 \neq x_2$ are not met, the region R degenerates to a plane, a line, or a point, respectively. A regular region r' is a sub-region of a region r if and only if, considering r' and r as sets:

$r' \subset r.$

The following are operations over binary numbers and integers:

B(x): returns the binary form $b=[b_{m-1}x, \ldots b_{0}x]$ of integer x, $B^{-1}(b)$: returns x if and only if B(x)=b, Get(x, j): returns the jth bit of B(x), Set(x, j, c): sets the jth bit of B(x) to the binary bit c and returns the corresponding integer.

The notations: || and && denote the logical OR and AND of predicates respectively, |, &, and ^ are used to denote, respectively, the bitwise OR, AND, and ExclusiveOR operations of two unsigned integers, while ~ denotes the bitwise complement of an unsigned integer. The notations <<m and >>m denote, respectively, the left and right shift-by-m-bit-positions operations on an unsigned integer.

The DST Transform

The Dimensional Shuffle Transform ("DST") is a mapping from three-dimensional space $D^3$ to one-dimensional space $D^1$, as defined below:

```
def H (z, y, x, w)
    k = 0
    ptr = 1
    for i = 0 to w−1
        dx = x & ptr
        x = x >> 1
        dy = (y & ptr) << 1
        y = y >> 1
        dz = (z & ptr) << 2
        z = z >> 1
        ktemp = dz | dy | dx
        ktemp = ktemp << (i * 3)
        k = k | ktemp
    end
    return k
end.
``` where w is the width, in bits, of a 3D coordinate along a 3D dimension. Given a point p in $D^3$, the DST Transform of the point k=H(p) is referred to as the "DST key" of the point p or more concisely as the "key."

Figure 2:
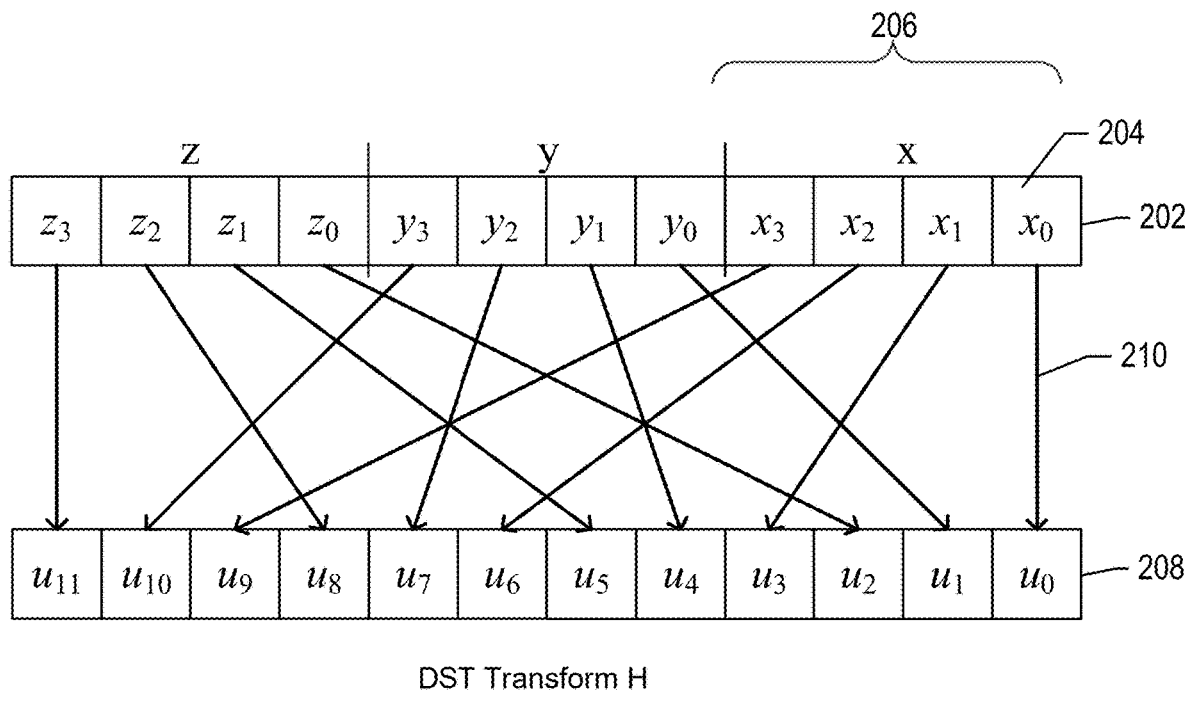
FIG. 2 illustrates the DST Transform H which maps 3D points to corresponding DST keys in a 1D space.

FIG. 2 illustrates the DST Transform of a 3D space of size 4096. As shown in FIG. 2, the 3D coordinates for a point p in this space are each encoded in a 4-bit nibble within a 12-bit array of bits 202. The bits that represent each coordinate are arranged in right-to-left order of significance, with the most significant bit of a coordinate representation located at the right-hand end of the nibble. For example, the bit 204 is the least-significant bit of the nibble 206 representing the x coordinate. The DST Transform splays out the bits of the 3D coordinates across a 12-bit representation 208, and forms a linear DST key k, as indicated by arrows, such as arrow 210, in FIG. 2. The 12-bit representation 208 of the linear DST key k can be thought of as a sequence of four three-bit blocks, each three-bit block containing an ordered triple of bits of a particular significance extracted from the corresponding 3D coordinates. In the example shown in FIG. 2, each nibble can represent 16 different values, and thus the 3D space contains $16^3=4096$ points. The cardinality of the one-dimensional transformed DST key space is equal to that of the original space. In the example shown in FIG. 2, 12 bits can represent $2^{12}=4096$ points.

The DST Transform H is clearly a bijection, and, as such, the inverse DST transform $H^{-1}$ exists, as follows:

```
def H⁻¹ (k, w)
    ptr = 1
    ptr2 = 1
    x = y = z = 0
    for i = 0 to (w-1)
        if (k & ptr) x = x | ptr2
        ptr = ptr << 1
        if (k & ptr) y = y | ptr2
        ptr = ptr << 1
        if (k & ptr) z = z | ptr2
        ptr = ptr << 1
        ptr2 = ptr2 << 1
    end
    return (z, y, x)
end
```

The result returned is a tuple of the 3D coordinates in the form of (z, y, x).

Figure 3:
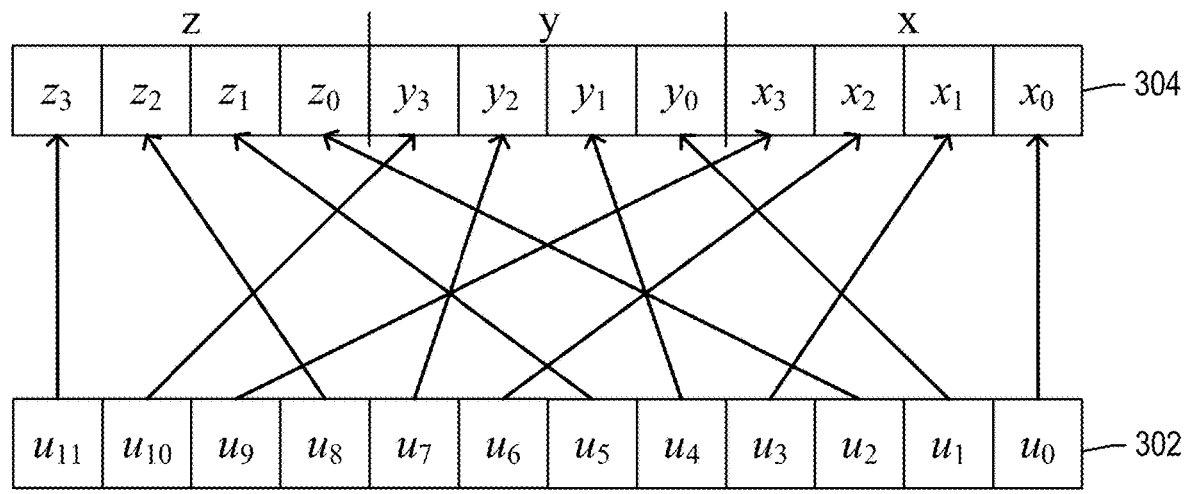
FIG. 3 illustrates the inverse DST Transform $H^{-1}$ using the same illustration conventions previously used in FIG. 1.

FIG. 3 illustrates the Inverse DST Transform $H^{-1}$ using the same illustration conventions previously used in FIG. 2. As shown in FIG. 3, bits of the 3D coordinates distributed across the 12-bit representation 302 of the DST key k are collected back into the three corresponding 4-bit-nibble representations of the 3D coordinates 304. Clearly, the inverse DST Transform $H^{-1}$ performs a transformation opposite from that performed by the forward DST Transform H, since the only difference between the illustrations shown in FIGS. 2 and 3 is the directions of the arrows representing the corresponding locations of the bits in the linear DST key k and the bits in the 3D coordinates.

The DST Transform has the property of preserving neighborhoods in that points close to one another in the 3D space tend to be close to one another in the transformed space. Another way of looking at the DST Transform is that the DST Transform imposes an implicit hierarchical recursive structure over the 3D space, where the original space, which can be considered to be a root cube with edges of length 2a, is conceptually divided into eight sub-cubes with edges of length a. The division can be recursively performed until the resulting sub-cubes degenerate to a point. The assertion that DST is a neighborhood preserving transform can then be formally justified by the fact that the DST keys of the points in a cube or sub-cube in this hierarchical structure form a linear region of keys with monotonically increasing consecutive values $[s, t]=\{k|s \geq k \geq t\}$ for two keys s and t, which will be referred to as the lower front and upper back corner of the cube or sub-cube, respectively.

Figure 4:
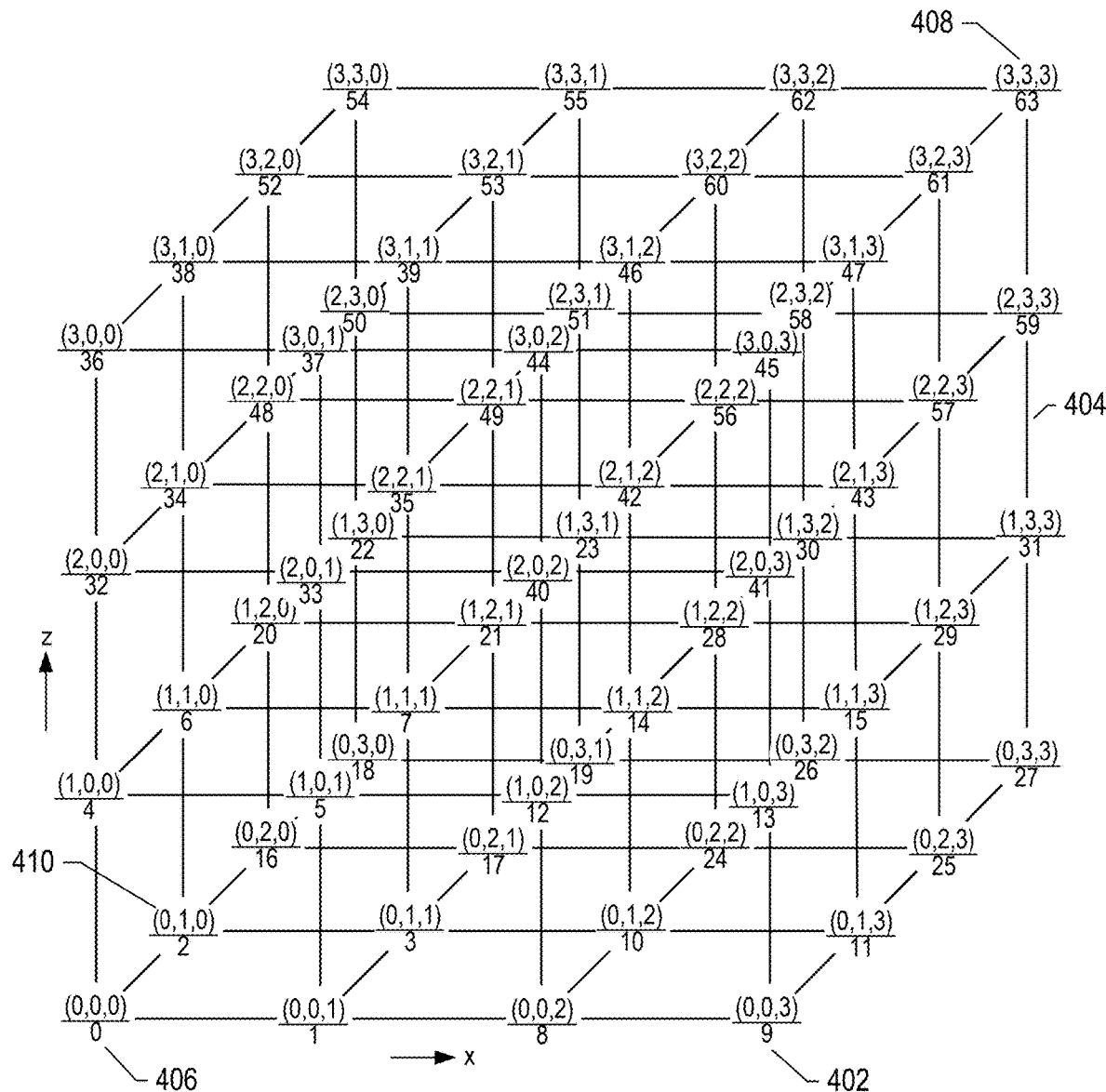
FIG. 4 illustrates the DST mapping of 64 points in a 3D space to 3D coordinates and corresponding keys in a 1D DST key space.

FIG. 4 illustrates a DST mapping between 64 points in a 3D space and corresponding DST keys generated by the DST transform. Each point, such as point 402, is labeled with the point's 3D (z, y, x) coordinates and with the point's corresponding DST key k, shown in FIG. 4 as (z, y, x)/k. The 3D space 404 shown in FIG. 4 includes the points with 3D coordinates that can each be represented using two bits. The entire space is contained within the cube having lower, left-hand corner point 406 with 3D coordinates (0, 0, 0), referred to as the "lower front" point, and having top, right-hand corner point 408 with 3D coordinates (3, 3, 3), referred to as the "upper back" point. There are other, smaller cubes for which the DST keys of the points form a monotonically increasing subset of the set of DST keys, such as the lower, left-hand corner cube 410 having corner points with the 3D coordinates (0, 0, 0), (0, 0, 1), (0, 1, 0), (0, 1, 1), (1, 0, 0), (1, 0, 1), (1, 1, 0), (1, 1, 1) and with corresponding DST keys 0, 1, 2, 3, 4, 5, 6, and 7. Were the space to include all the points with 3D coordinates that can each be represented using three bits, the volume representing the space would include 512 points and were the space to include all the points with 3D coordinates that can each be represented using four bits, the volume representing the space would include 4096 points.

Regions and their Properties

The key space of DST has a hierarchical structure, which DST-based space search and voxelization exploits to deliver high performance. To achieve this, the following notions are now introduced.

Given two keys $k_1$ and $k_2$, the regular region defined by the two keys, denoted by $<k_1, k_2>$, is given by $\{(z, y, x) | \min(x_1, x_2) \leq x \leq \max(x_1, x_2), \min(y_1, y_2) \leq y \leq \max(y_1, y_2), \min(z_1, z_2) \leq z \leq \max(z_1, z_2)\}$, where $(z_1, y_1, x_1) = H^{-1}(k_1)$, $(z_2, y_2, x_2) = H^{-1}(k_2)$. A pair of keys $k_1 = H(z_1, y_1, x_1)$, and $k_2 = H(z_2, y_2, x_2)$ is said to be canonical if $x_1 \leq x_2$, $y_1 \leq y_2$, and $z_1 \leq z_2$ hold at the same time. With canonical pairs of keys, the definition of a regular region can be simplified as $<k_1, k_2> = \{(z, y, x) | x_1 \leq x \leq x_2, y_1 \leq y \leq y_2, z_1 \leq z \leq z_2\}$. It is apparent that any pair of keys can be easily converted into a canonical pair of keys which defines exactly the same regular region. Hence, without loss of generality, only canonical pairs of keys will be used to define a region in the rest of this embodiment.

A linear region defined by the two keys, denoted by $[k_1, k_2]$, is given by $\{(z, y, x) | k_1 \leq H(z, y, x) \leq k_2\}$. It can be easily shown that $<k_1, k_2> \subseteq [k_1, k_2]$ always holds. Hence, a linear region $[k_1, k_2]$ always has a recall of 100%, where recall is defined as the ratio between the number of points that should be there and the number of points that are actually there, when used to approximate a regular region $<k_1, k_2>$, since every point in a regular region is necessarily contained in the corresponding linear region.

The precision of a region specified by two keys $(k_1, k_2)$ is defined as $$\text{Prec}(k_1, k_2) = |<k_1, k_2>| / |[k_1, k_2]|$$

where |*| denotes the cardinality of a set. It follows that the precision of a region is always less than or equal to one. A region with precision one is a perfect region and a region with precision one and with the lengths of the edges along all dimensions equal to one another is referred to as a perfect cube.

The DST level is a fundamental characteristic of a region, which among other applications, is used in determining the dividing planes during region decomposition. The level of region defined by two keys $k_1, k_2$ is calculated by the method "Lvl," as follows:

```
def Lvl (k₁, k₂, w )
    k = k₁ ^ k₂
    level = w - 1
    window = 7 << (3 * (w - 1) )
    while ( (window & k) == 0 && level >=0)
        window >> 3
        level = level - 1
    end
    return level
end
```

The level of a region $(k_1, k_2)$ is thus computed by first taking the XOR of the two keys to get k, then from the left to write, examine each 3-bit section of k, until found a section that is not all zero bits. At the start, the level is set to w−1, where w is the number of bits in the binary representation of the coordinates. It is being decreased each time an all-zero 3-bit section is found, until a section with non-zero bit(s) is found. The value of level at that time is returned as the level of the region $(k_1, k_2)$.

A non-perfect region with a higher level volume can always be decomposed into lower level regions with higher precisions. The decomposition is done in a way that maximizes the precision. The following method Pat is an auxiliary method used in the determination of an optimal decomposition:

```
def Pat(k₁, k₂, L)
    k = k₁ ^ k₂
    pat = 7
    pat = pat << 3*L
    pat = pat & k
    return pat >> 3*L
end
```

Given two keys $k_1$ and $k_2$ and a pre-calculated level of $(k_1, k_2)$, $Pat(k_1, k_2)$ calculates the pattern of the defined region, subsequently used in the decomposition of the region. The pattern is necessarily an integer with an integer value in the range 1, ..., 7. The pattern, in its binary form $(b_2, b_2, b_1)$, indicates the dividing axes in a decomposition. When there is only one non-zero bit in the pattern, the region is decomposed by dividing the region by a plane perpendicular to the axis corresponding to the position of the bit in the pattern. When there are two non-zero bits, the region is decomposed by two planes perpendicular to the corresponding axes indicated by the pattern. When there are three non-zero bits, the region is decomposed by dividing the region by three mutually perpendicular planes.

Figure 5:
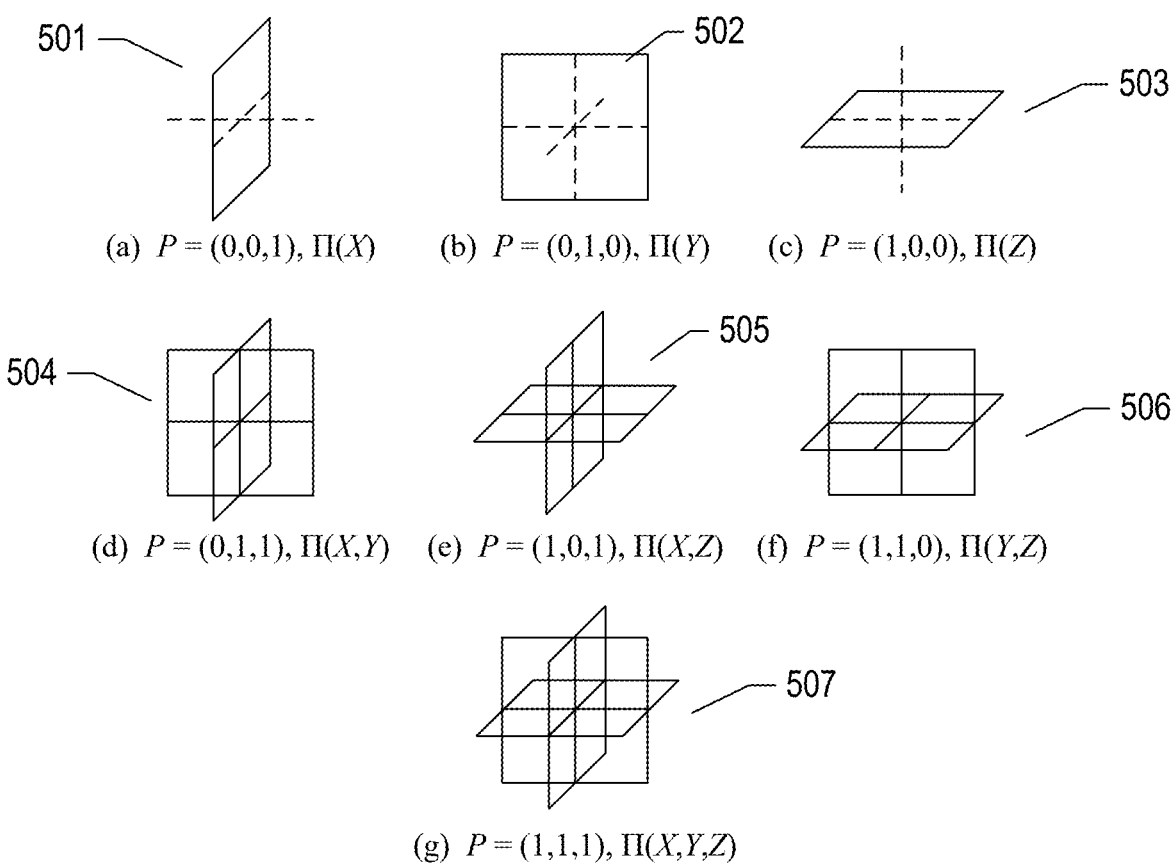
FIG. 5 illustrates seven different partitions of a region according to a pattern calculated by the method Pat, which leads to optimal decomposition of the region.

FIG. 5 illustrates seven different region decompositions according to the different patterns calculated by the method Pat. The pattern 001 (501) indicates division by a plane perpendicular to the X axis, or alternatively, we say that the division is along the X axis. Similarly, a pattern 010 (502) calls for a division by Y axis, and the pattern 100 (503) indicates a division along the Z axis. On the other hand, the pattern 011 (504) indicates a division along both the X and Y axes. The pattern 101 (505) indicates division along X and Z axes and the pattern 110 (506) indicates division along Y and Z axes. The pattern 111 (507) indicates division by three mutually perpendicular planes, and hence dividing the region along each of the three axes. Of the seven decompositions, three are binary, three are quaternary, and one is octonary.

Region Decomposition

Two auxiliary methods are used to identify the corners of the perfect region of a given level in which a given point resides. Given the key of a point and a level, the following method LowerFt calculates the lower front corner of the perfect cube at the given level to which the point belongs. The method LowerFt sets each of the least significant 3*L bits of the key to the bit value 0.

```
def LowerFt(k, L)
    ptr = 1 << 3*L
    rightOnes = ptr - 1
    rightZeros = ~ rightOnes
    return (k & rightZeros)
end
```

Given the key of a point and a level, the method UpperBk calculates the upper back corner of the perfect cube at the given level to which the point belongs. The calculation of UpperBk sets each of the least significant 3*L bits of k to the value of bit value of one.

```
def UpperBk(k, L)
    ptr = 1 << 3*L
    rightOnes = ptr - 1
    return (k | rightOnes)
end
```

Given three keys $k_1$, $k_2$, and $k_3$, the following utility method C returns the concatenated 3D coordinates of a point that has the same x coordinate as the 3D point corresponding to $k_1$, the same y coordinate as the 3D point corresponding to $k_2$, and the same z coordinate as the 3D point corresponding to $k_3$, using predefined bit masks XMask=(001001 ... 001), YMask=(010010 ... 010), and ZMask=(100100 ... 100):

```
def C(k₁,k₂,k₃)
    x = XMask & k₁
    y = YMask & k₂
    z = ZMask & k₃
    k = (x | y | z)
    return k
end
```

An m-ary decomposition for a given pattern P is written as $\Pi^P(k_1, k_2) = ((k_1^0, k_1^1), \ldots, (k_{m-1}^0, k_{m-1}^1))$. The m subregions are each specified by a pair of canonical keys. It follows that besides $k_1$ and $k_2$, $2m-2$ keys need to be calculated. It turns out that the $2m-2$ keys can be efficiently derived from $k_1$, $k_2$, $u=upperBk(k_1,L)$, and $v=lowerBk(k_2, L)$, where $L=Lvl(k_1, k_2, w)$.

For example, the three methods, with names $\Pi^1$, $\Pi^2$, and $\Pi^4$, where the superscript 1 represents the binary pattern 001, the superscript 2 represents the binary pattern 010, and the superscript 4 represents the binary pattern 100, carry out a binary decomposition of a region $<k_1, k_2>$ of given level L. The method $\Pi^1$ is next provided:

```
def Π¹(k₁, k₂, L)
    k_u = UpperBk (k₁, L - 1)
    k_v = LowerFt (k₂, L - 1)
    k₃ = C(k_u, k₂, k₂)
    k₄ = C(k_v, k₁, k₁)
    return ((k₁, k₃), (k₄, k₂))
end
```

The above method performs a binary decomposition of a region along the X axis. Similarly constructed methods $\Pi^2$ and $\Pi^4$ perform binary decompositions along the Y and Z axes, respectively.

The method $\Pi^3$ carries out a quaternary decomposition of a region $<k_1, k_2>$ in accordance with pattern 011 (504 in FIG. 5) along both the X and Y axes. This method is performed as follows:

```
def Π³ (k₁, k₂, L)
    k_u = UpperBk (k₁, L - 1)
    k_v = LowerFt (k₂, L - 1)
    k₁₂ = C(k_u, k_u, k₂)
    k₂₁ = C(k_v, k₁, k₁)
    k₂₂ = C(k_v, k_u, k₂)
    k₃₁ = C(k₁, k_v, k₁)
    k₃₂ = C(k_u, k_v, k₂)
    k₄₁ = C(k_v, k_v, k₁)
    return ((k₁, k₁₂), (k₂₁, k₂₂), (k₃₁, k₃₂), (k₄₁, k₂))
end
```

Methods $\Pi^5$ and $\Pi^6$ are two additional quaternary decompositions for patterns that have two bits with the value of one. They are constructed similarly to method $\Pi 3$. In contrast Method $\Pi^7$ performs an octonary decomposition along the three axes for the pattern is 111 (507 in FIG. 5):

```
def Π⁷(k₁, k₂, L)
    kᵤ = UpperBk (k₁, L - 1)
    kᵥ = LowerFt (k₂, L - 1)
    k₂₁ = C(kᵥ, k₁, k₁)
    k₂₂ = C(k₂, kᵤ, kᵤ)
    k₃₁ = C(k₁, kᵥ, k₁)
    k₃₂ = C(kᵤ, k₂, kᵤ)
    k₄₁ = C(kᵥ, kᵥ, k₁)
    k₄₂ = C(k₂, k₂, kᵥ)
    k₅₁ = C(k₁, k₁, kᵥ)
    k₅₂ = C(kᵤ, kᵤ, k₂)
    k₆₁ = C(kᵥ, k₁, kᵥ)
    k₆₂ = C(k₂, kᵤ, k₂)
    k₇₁ = C(k₁, kᵥ, kᵥ)
    k₇₂ = C(kᵤ, k₂, k₂)
    return
        ((k₁, kᵤ),(k₂₁, k₂₂), (k₃₁, k₃₂), (k₄₁, k₄₂),
         (k₅₁, k₅₂), (k₆₁, k₆₂), (k₇₁, k₇₂, (kᵥ, k₂))
end
```

Given a region R that is a non-perfect region defined by two keys $k_1$ and $k_2$, with an m-ary pattern, let the m sub-regions $(k_{11}, k_{12}), \ldots, (k_{m1}, k_{m2})$ be produced by decomposition of the region according to the pattern be $(k_{11}, k_{12}), \ldots, (k_{m1}, k_{m2})$ and let $$s = k_2 - k_1 + 1$$

$$s_2 = \Sigma_1^m (k_{i2} - k_{i1} + 1),$$

then it is easy to show that $s_2$ is always less than $s_1$. It follows that the precision of a non-perfect region is improved after a DST decomposition. Moreover, DST decompositions have the following properties: (1) any largest perfect region contained in the region is contained in a sub-region in the result as a whole and will never be partitioned; and (2) there are no other decompositions of the same arity (m) with an overall linear size smaller than $s_2$. In this sense, the DST decompositions according to the corresponding patterns are optimal.

The above showed that once a search over a region is reduced to two or more searches over its sub-regions by a DST decomposition, the precision of the search can be much improved. This allows one to approximate the search over a 3D region to be replaced by a number of searches over the linear regions in one dimensional space with any desired precision, including the special case where precision is one. In the following, the regional search methods are provided.

Regional Search

The DST based search methods are based on decompositions, which are first provided below. The decomposition of a region $(k_1, k_2)$ is performed by the following method, which first identifies the pattern of the region and then calls the corresponding decomposition method:

```
def Π(k₁, k₂)
    L = Lvl(k₁, k₂)
    P = Ptn(k₁, k₂)
    case P of
        1: d = Π¹(k₁, k₂, L)
        2: d = Π²(k₁, k₂, L)
        3: d = Π³(k₁, k₂, L)
        4: d = Π⁴(k₁, k₂, L)
        5: d = Π⁵(k₁, k₂, L)
```

-continued

```
        6: d = Π⁶(k₁, k₂, L)
        7: d = Π⁷(k₁, k₂, L)
    end
    return d
end
```

Let $<s, t>$ be a non-perfect region, and $\rho$, a number between 0 and 1, the desired precision. The following method recursively decomposes the region into sub-regions unless its precision is equal to, or higher than, $\rho$:

```
def Π^R (s, t, ρ)
    Task = 0
    Results = 0
    Decs = 0
    push (Task, (s, t))
    while (NotEmpty(Task))
        (k₁, k₂) = pop (Task)
        if (Precision (k₁, k₂) ≥ ρ)
            push (Result, (k₁,k₂))
        else
            Decs = Π(k₁, k₂)
            while (NotEmpty (Decs))
                push (Task, pop( Decs ))
            end
        end
    end
    return Result
end
```

The search of a region in 3D space is therefore a recursive process. A sub-region is further decomposed if and only if its precision has not reached the specified precision $\rho$. The result of the above search is a list of linear regions with precisions equal to, or higher than, the specified precision $\rho$.

There are other ways to control the recursion. One of them depends on the notion of geometric level. Given a regular region $<s, t>$ and its longest edge along dimensions l, the regular region has a geometric level of $\lceil \log_2(l) \rceil$. It is easy to verify that the geometric and DST levels are equal for a perfect cube at any level, and the former is smaller than, or equal to, the latter, for any region. The difference between the geometric and DST levels of a region is thus an indicator to how close the region is to a perfect cube. A specified value for the difference between the geometric and DST levels of a region can therefore be used instead of a specified precision to control recursion in $\Pi^R(s, t, \rho)$.

No matter how the value of precision or level difference is chosen, method $\Pi^R$ always yields a result with 100% recall. The freedom of setting different stopping thresholds for the recursive divide-and-conquer process allows a tradeoff between the precision and computing speed, which can be easily exploited for performance optimization. Moreover, setting up a lower precision and then filtering out some or all of the remaining points might lead to an overall faster solution than specifying a higher precision at the start.

The result of the above decomposition by $\Pi^R$ is a list of disjoint linear subregions with certain desired precision. The search over a 3D region can thus be reduced to searches over several 1D intervals of the linearly ordered DST key spaces.

Since the linear regions by the decomposition with method $\Pi^R$ are disjoint, the searches over these regions are independent of each other and can therefore be done in parallel. Moreover, the recursive decomposition process can be done in parallel with the search over any so far discovered regions to afford another level of parallelism provided that sufficient computing resources are available.

Data Repository

In general, to support operations over a 3D space, some form of data structure is first built. Examples of such data structures include k-d trees, octrees, and R-trees. These tree-based structures are repeatedly traversed by following pointers in the tree structures to complete operations over the structure. By contrast, DST based approaches, as shown below, uses a data structure, referred to as the data repository (Repo), without pointers. A Repo serves as a container for the points in the space and is utilized to support efficient search operations with DST decomposition.

The following method builds the Repo, using DST. for a space S, which is represented by an array of points with three-dimensional coordinates.

```
def Build(S)
    Repo = [ ]
    N = size(S)
    for i = 0; i < N; i++)
        (z, y, x) = S[i]
        k = H(z, y, x)
        Repo[i] = k
    end
    Repo = Repo.sort()
    return Repo
end
```

Note that the resulting Repo is an array containing DST transformed keys sorted in ascending order. The Find(Repo, s, t) operation finds keys in a Repo with values greater than, or equal to, s and smaller than, or equal to, t:

```
def Find(Repo, s, t)
    i = firstEqGreater(Repo, s)
    j = lastEqSmaller(Repo, t)
    return Repo[i : j]
end
```

Space Search Operations

There are three search operations frequently used in 3D space and point-cloud analysis: Cubical Search, Radius Search, and K Nearest Neighbor (KNN) Search.

A cubical search finds the points encompassed by a 3D cube, which can be given in the form of a regular region <s, t>. Let ps=(xs, ys, zs), pt=(xt, yt, zt) be two points in the space with the property that xs xt, ys yt, zs zt, s=H (zs, ys, xs) and t=H(xt, yt, zt), a cubical search Cubical(s, t) finds the set P of points $$P=\{p=(x,y,z) | xs \leq x \leq xt, ys \leq y \leq yt, zs \leq z \leq zt\}$$

The two DST keys for the points ps and pt therefore define the two diagonal corners of a cube. Cubical Search finds the points encompassed by the cube. Note that there is no requirement for the edges of the cube to have equal lengths.

It has been shown, above, how the method $\Pi^R(s, t, p)$ decomposes a cubical region <s, t> into a number of sub-regions with precision no less than $0 \leq p \leq 1$. The search of the 3D sub-regions can be approximated by a search over the linear sections in the Repo with precision of p, including the case p=1. To perform the search of linear sections within the Repo, the Find operation can be utilized. The code for the cubical search operation is listed below:

```
def CubicalSearch(Repo, s, t, p)
    linearRegions = Π^R (s,t,p)
    m = NumberOf (linearRegions)
    result = [ ]
    for (i = 0; i < m; i++)
        (s, t) = PopFront(linearRegions)
        ps = Find(Repo, s, t)
        result = result.append(ps)
    end
    return result
end
```

A radius search, also known as spherical search, over a space S takes a point in the space and a radius as arguments and returns the points in the space which are within the specified distance away from the specified point.

Note that a point and a radius define a 3D sphere in the space, hence the radius search can be viewed as a search over the defined 3D sphere. Radius search can be accomplished by first constructing a cube that circumscribes the sphere and then performing a cubical search over the circumscribing cube. The result of this cubical search contains the points inside the sphere and thus has a recall of 100%. However, all the points in the results do not necessarily fall inside the sphere. The points in the result can then be filtered to retain only those points that are indeed within the 3D sphere.

Figure 6:
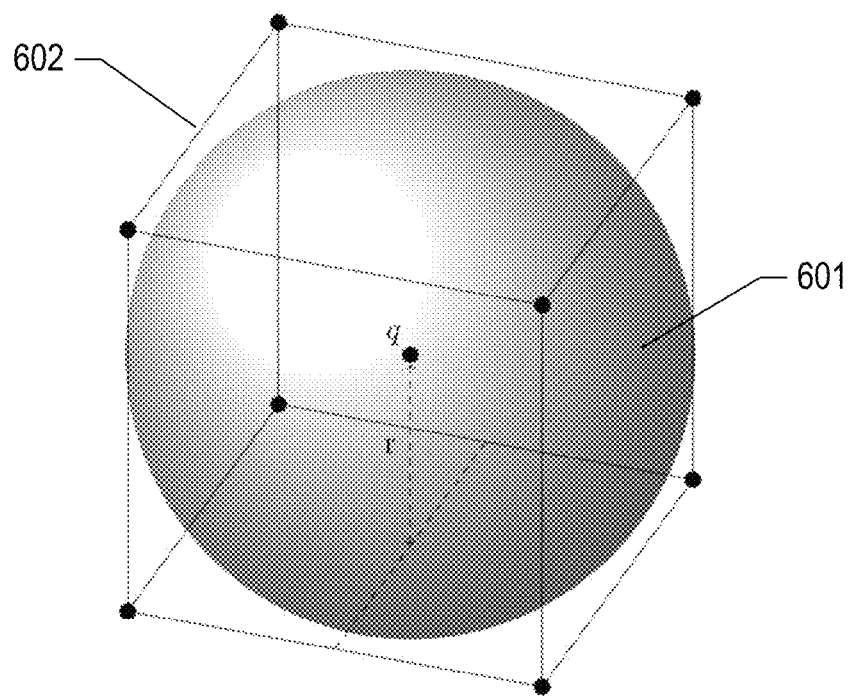
FIG. 6 shows a spherical neighborhood R with radius r circumscribed within a cube with edge length 2r.

FIG. 6 illustrates a sphere defined by a point q and a radius r and a cube that circumscribes the sphere. The following Radius Search method takes a DST key q that represents a center point and a radius r as arguments, and returns the points within the distance r from q, where w is the number of bits to encode each coordinate:

```
def RadiusSearch(Repo, q, r, w, p)
    (z, y, x) = H^-1 (q, w)
    xs = x-r, ys = y-r, zs = z-r
    xt = x+r, yt = y+r, zt = z+r
    s = H (zs, ys, xs, w)
    t = H (zs, yt, xt, w)
    cubialResult= CubicalSearch(s, t, p)
    result = [ ]
    m = sizeOf(cubialResult)
    for (i = 0; i<m; i++)
        pointKey = cubialResult[i]
        (z2,y2,x2)= H^-1 (pointKey)
        if ((x2-x)^2+(y2-y)^2 + (z2 − z)^2) ≤ r^2
            result.push(pointKey)
    end
    return result
end
```

Note that RadiusSearch uses CubicalSearch to perform the main work. The result of the above RadiusSearch is guaranteed to have 100% recall and 100% precision. The precision parameter p for the method does not impact the final precision. However, the value of p does allow a trade-off between the time spent by CubicalSearch and the time spent by the for loop that filters out outliers in the result.

K nearest neighbor (KNN) is another frequently used search in sensing and control systems. Given a point in the 3D space, KNN returns K points that are closer to a specified point than any other points in the space. The method to perform KNN search is given below, where repo is the data repository for the 3D space, k is the DST transform of a point p in the space, w is the number of bits used to encode each coordinate, and r is an initial guess of the radius of a sphere that may contain K or more points:

```
def KNN(Repo, k, r, w)
```

```
            points = RadiusSearch(Repo, k, r, w, 0.5)
            if size (points) < k
                r = 2*r
                KNN(Repo,k,w,r)
            else
                sort(points)
            end
            result = points [0:k-1]
            return result
        end
```

As shown above, the KNN method calls RadiusSearch with a specified radius that may be estimated based on experience or calculated from the density of the point cloud. When the result returned by RadiusSearch contains less than k points, RadiusSearch recursively calls itself with a doubled radius. On the other hand, when the result contains k or more points, the result is then sorted and the first k points are returned as the result.

Figure 7:
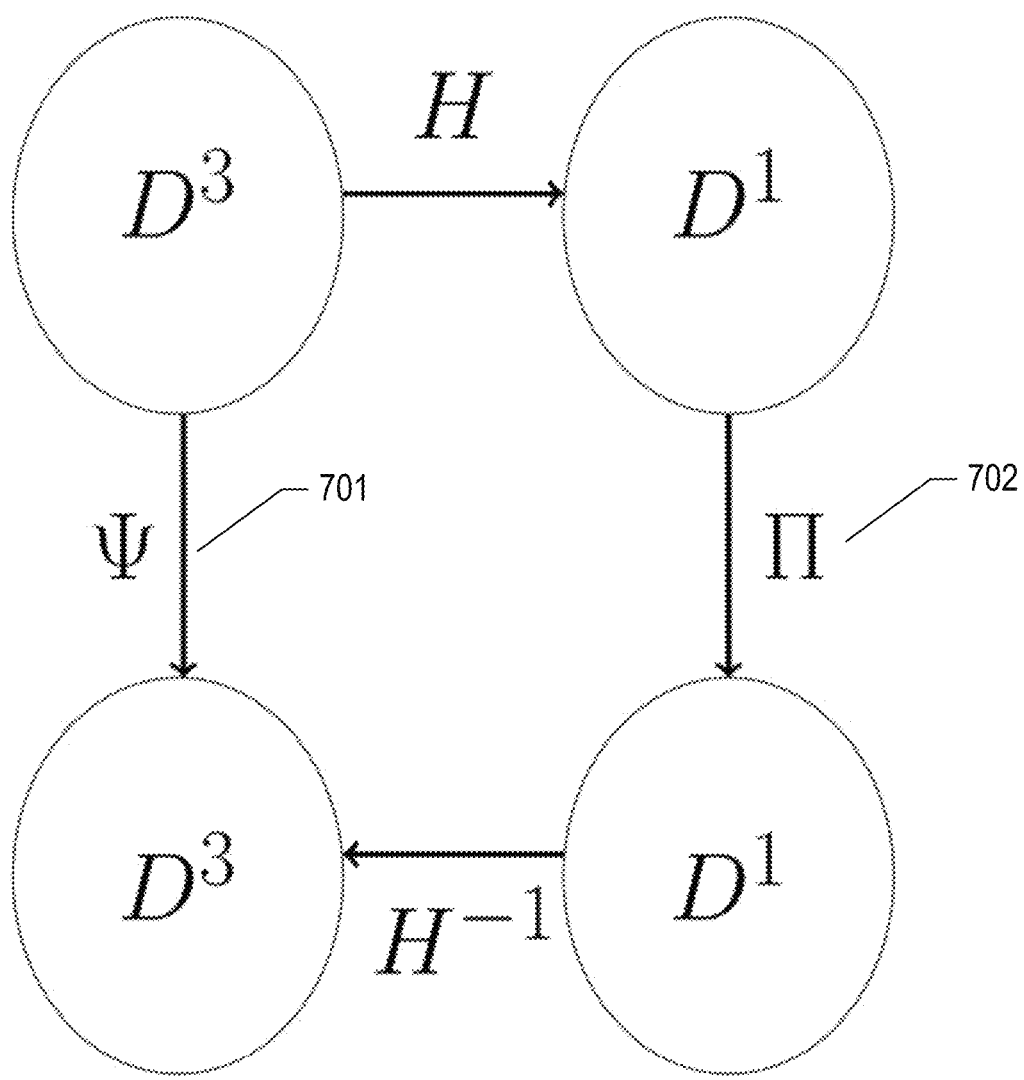
FIG. 7 illustrates the difference and relationship between two approaches to solving the 3D-space search problem.

FIG. 7 illustrates the difference between the conventional and DST-based space search approaches. Conventionally, 3D Space search has been mostly performed directly over the 3D space, using methods, denoted $\psi$, that are often based on a tree structure, such as k-d trees. The current method differs from the conventional approaches in that it uses a DST transform, denoted H, to reduce the 3D problem to a 1D problem in the domain of a one-dimensional space with special properties. The search is then performed in the one-dimensional space using an efficient method denoted $\Pi$ The results are then transformed back to the 3D domain using $H^{-1}$, the inverse transform with respect to H. In functional notation, the methods can be concisely summarized as $\psi = H^{-1} \cdot \Pi \cdot H$. FIG. 7 provides an illustration of the current H-and-$H^{-1}$-transform based approach (702) and the direct methods denoted by $\psi$(701). Both theoretical analysis and empirical tests have shown that DST-based space search methods are much faster than direct methods such as those with k-d trees, and asymptotically of a lower complexity class than other search methods.

Finally, a very fast search method for the nearest neighbor or neighbors of a point by searching the perfect cube of a certain level in which point p resides is provided below:

```
        def Nbr_cube(p, L_c)
            k = DST (p)
            s = LowerFront (k, L_c)
            t = UpperBack(k, L_c)
            neighbors = Get (Repo, s, t)
        end
```

Point-Cloud Downsampling

The purpose of point-cloud downsampling is to reduce the size of the point-cloud data set while retaining the overall geometric structure. This procedure is generally applied to every new frame of a frame sequence in order to reduce the cost of further computation. Existing methods include: (1) removing every k-th point from the input with respect to some ordering of the data points; and (2) using an octree to filter out all but one point in each octree cell with a certain resolution.

With the implicit hierarchical structure that results from the DST transform, a point cloud can be downsampled efficiently with a Repo built from the point cloud. The following method carries out this downsampling, or compression, to ensure that exactly one point is kept inside each non-empty perfect cube of a chosen level L in the derived point cloud:

```
        def DownSamp (Repo, p, L)
            RepoNew = [ ]
            n = size (Repo)
            i = 0
            while i < n
                k = Repo[i]
                s = LowerFront(k, L)
                t = UpperFront(k, L)
                j = Repo.indexOf(t)
                i = j+1
                RepoNew.push(k)
            End
        End
```

The sub-region defined by the two keys s and t in the DownSamp operation is a perfect cube; therefore, this operation needs no further region decomposition. The functionality of this method is equivalent to downsampling by octree. The difference is that the above method uses neither the explicit construction of an octree nor any tree traversals.

The point-cloud search and downsampling methods, discussed above, provide order(s) of magnitude improvements in the computational efficiency of point-cloud-registration procedures in sensing and control systems, such as denoising and clustering, because searching generally takes up 75% or more of the total computational time in those procedures. As discussed above, this represents an enormous improvement in these types of sensing and control systems, both from the standpoint of energy consumption, memory-resource consumption, and real-time performance, moving point-cloud registration and other modules of sensing and control systems such as autonomous vehicle from the prototype and research realms into the realm of practical, commercially feasible systems. The DTS transform, along with the decomposition and searching methods discussed above, can be usefully applied in many problem domains, just as Fourier transforms are used throughout science and technology, from image and signal processing to quantum mechanics and molecular-structure determination.

Space with Negative and/or Decimal Coordinates

DST transform is defined over unsigned integers. When the space includes negative and/or decimal coordinates, the coordinates can be shifted and scaled so that coordinates are changed into non-negative integers. The results can then be shifted and/or scaled to recover the coordinates in the original form.

Black-White Array

In this implementation, the values in a data repository ("Repo") are assumed to be drawn from an ordered set. Note that DST keys are nonnegative integers in a 1D space even though they are derived from the coordinates of the points in a 3D space. The data repository Repo is static when the Repo does not support insertion and deletion of data points. The repositories used in the previous sections are therefore static. The Black-White Array (BWA) is introduced here to support the construction and searching of dynamic data sets from which data points can be added and removed. The operations supported by the Black-White Array include (1) Insert (v), which inserts a value v into the Repo; (2) Search (v), which finds the location inside Repo where the value equal to v, if v exists in the Repo, and otherwise returns nil; (3) $Find^d$ (u, v), which finds the values in the Repo that fall in the closed interval [u, v]; and (4) Delete (v), which removes the value v from the data set. The Find operation is motivated by applications such as DST transform, which reduces a 3D regional search to a number of 1D interval searchers. The BWA provides support for DST-based searches that work with dynamic 3D spaces.

Dynamic data structures with operations similar to that of the BWA have long been studied. Examples include linked lists, binary search trees, and quite a number of well-known tree-based data structures. A salient example among them is the Red-Black Tree.

Black-White Array supports the above-specified operations. The BWA differs from the Repo introduced in the previous sections by providing insert and delete operations, needed for implementing a dynamic set. Dynamic sets are important for many functional modules in sensing and control systems, including dynamic voxel maps that maintain a dynamic point-cloud structure that changes with time. Unlike tree-based solutions, BWA is completely array-based, and, as such, avoids the need for pointer referencing, pointer dereferencing, and tree rebalancing, and thus avoids the associated space and time costs related to pointer operations and tree rebalancing.

BWA Structure

A BWA with a capacity of $N=2^k$ consists of a pair of arrays, the Black Array ("B") and the White Array ("W"), of sizes N/2 and N, respectively. The entries in the B array are indexed by indices ranging from 1 to (N/2)−1 while the indices in the W array range from 1 to N−1. Both the B and W arrays are conceptually divided into segments of different ranks, where segment i contains entries with indices in the interval of $[2^i, 2^{i+1}-1]$. It follows that, for a BWA of capacity of $N=2^k$, the W and B arrays have a total of k and k−1 segments respectively. A segment of rank r holds exactly $2^r$ entries.

In the following discussion, $Seg^w(i)$ and $Seg^b(i)$ denote the segments of rank i in the White and Black arrays, respectively. A segment is said to be occupied or active when it is filled with valid inserted value(s). By definition, the highest index in Seg(i), written S(i), is given by $2^{(i+1)}-1=1<<(i+1)-1$, where "<<" is the left-shift operation on the binary representation of an integer. The lowest index in Seg(i), denoted T(i), is given by $2^i=1<<i$. The highest and lowest indices of a segment are referred to, respectively, as the starting (s) and terminating (t) positions of the segment.

Figure 8:
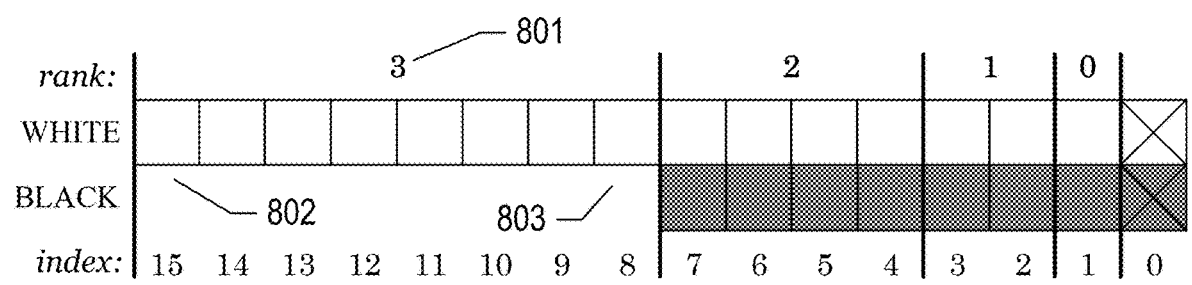
FIG. 8 illustrates the layout and structure of a BWA, including BWA segments and segment ranks.

FIG. 8 provides an illustration of the layout of the BWA structure with a capacity of 16. Note that both the indices of array entries and the ranks of the segments are arranged in the ascending order from right to left. There are four white segments in the BWA, of which the leftmost has the highest rank of 3 (801). This segment has a starting position of 8 (803), a terminating position of 15 (802), and a length of 8.

Black-White Array Operations

The insert operation is performed by the following recursive rules: (1) a new value is inserted into $Seg^w(0)$ when $Seg^w(0)$ is not occupied and, otherwise, the new value is inserted into $Seg^b(0)$; (2) for any rank i, whenever $Seg^w(i)$ $Seg^b(i)$ are both occupied, they are merged as one sorted sequence and the result is put into $Seg^w(i+1)$, when $Seg^w(i+1)$ is not occupied and, otherwise, put into $Seg^b(i+1)$, with a merge of two segments with rank i+1 invoked recursively.

Note that the above-mentioned "merge" assumes two sorted sequences of the same length and merges them into one sequence of doubled length. The merge has the same function as the well-known merge sort.

To adhere to the above rules, the occupancy of the white segment of a given rank needs to be determined. This can be done by tracking the total number of values inserted into the white segment. Let t be that total number, which is set to zero for a new BWA, and, whenever a new value is inserted, t is set to t+1. It can then be easily verified that, given the rules stated above, $Seg^w(i)$ is occupied if and only if the ith least significant bit of t is one. More formally, the Insert method that puts a new value v into the BWA is given below:

```
def Insert (v)
    ptr = 1;
    if (t&ptr == 0)
        W[0] = v
    else
        B[0] = v
        merge (0)
    end
    t = t+1
end
``` where t is the total number of value(s) stored in the BWA. The function merge is called to merge black and white segments of a given rank with possible recursion, as defined by:

```
def merge (i)
    ptr = 1 << (i+1)
    if (t&ptr == 0)
        Seg^w(i+1) = merge (Seg^w(i), Seg^b(i))
    else
        Seg^b(i+1) = merge (Seg^w(i), Seg^b(i))
        merge (i+1)
    end
end
```

FIG. 9 illustrates an insert operation carried out by the above-described recursive merging process. In the example shown in FIG. 9, the BWA has a capacity N=16. When the new value 52 is inserted, the total t is equal to 7 (0111), indicating the three lowest ranked white segments are occupied. The new value is first put in $Seg^b(0)$ (901). This leads to a merge of $Seg^w(0)$ and $Seg^b(0)$, and the result is put in $Seg^b(1)$ (902). A merge between $Seg^w(1)$ and $Seg^b(t)$ (903) followed by a merge between $Seg^w(2)$ and $Seg^b(2)$ then takes place successively until the final result is put in $Seg^w(3)$ (904).

It follows from the rules of BWA insertion that, whenever the number of inserted values is a power of two, $t=2^m$, the values appear in the BWA's white segment of rank m as a sorted sequence. It can also be proven that this sorting-by-insertion-with-BWA procedure involves the same number of comparisons as the well-known merge sort when the BWA is used to incrementally sort a sequence of numbers.

Observe that the values left in the lower-ranked segments after a merge does not affect the correctness of further BWA operations, and, therefore, there is no need to spend the time to remove them. For example, after the insertion-and-merge process illustrated in FIG. 9, the total t will be increased from 7 (0111) to 8 (1000), which indicates that values in the three lowest ranked segments are now treated as void.

The search operation over a BWA depends on the segSearch method which searches for the value v in a segment with rank i:

```
segSearch(v, i)
    s = S(i)
    t = T(i)
    r = binarySearch (W, v, s, t)
    return r
end
``` where the binarySearch of the segment of rank i in the white array is delineated by the points s and t. The returned index is thus a global index into the White array, which is achieved with a binary search.

The Search operation then utilizes the segSearch method to search through the BWA one segment at a time, from highest rank k down to rank 0, until either the search value is found, and the index returned, or the value is not found, and Nil is returned.

```
Search(v)
    r = Nil
    for (i=k-1; i ≥ 0; i--)
        if (active?(i))
            r = segSearch(v, i)
        end
        if (r != Nil)
            break
        end
    end
    return r
end
```

Note that the active? function is used to determine if the Segment with rank i is occupied, which, as pointed out previously, is done by checking if the ith least significant bit of t, which is the total number of values in the BWA.

The method Find(Repo, s, t), discussed above in the section Data Repository, is used in DST-based space searching with a static data set. To support the space search over dynamic data sets into which points can be inserted and from which points can be deleted, the BWA is used as a dynamic data repository. The method corresponding to Find(Repo,s,t) for a static data repository is now denoted by $Find^d$(BWA, s, t), which returns the values k that meet the condition of s≤k≤t. By replacing Find(Repo, s, t) by $Find^d$(BWA, s, t), the methods for space search over static repositories work for dynamic data sets.

In a BWA repository, the values are stored in a number of segments, and the values in each segment are sorted. By viewing each segment as a small repo, the $Find^d$(BWA,s,t) can be implemented by a number of Find(repo, s, t) operations, where the lowercased repo represents a segment of the BWA. A method for Find(BWA,s,t) that for the points within each voxel follows this approach is given below:

```
def Find^d(BWA, s, t)
    r = highestRankOfBWA
    result = { }
    for (i = r; i ≤0; i-- )
        if (active? (i))
            segResult = Find(Seg, s, t)
            result = result.append(segResult)
        end
    end
end
```

The BWA provides for implementation of a fully dynamic data repository that not only supports the insert operation discussed above, but that also supports the delete operation which removes a specified value from the dynamic data repository, when the specified value is contained in the dynamic data repository. The method Delete is implemented as below:

```
def Delete(v)
    r = Search(v)
    if (r == Nil) return Nil
    else
        W[r] = VOID
        i = seg(r)
        V[i] = V[i] −1
```

```
        if (V[i] ≤ (size(i) / 2))
            j = i−1
            demote(j)
            if (active(j))
                merge (j)
                total = total − size (j)
                V[j] = V[j] + V[j−1]
            else
                total = total − size (j)
                V(j) = V[i]
            end
        end
    end
```

As shown above, the Delete operation uses a search to first decide whether the specified value resides in the repository and returns Nil when the value is not found. When the value is found with a global index r, the value is set to Void in the white array (W). The number of non-Void values in the corresponding segment is then decreased by one. When this number is equal to, or smaller than, half of the segment size, a demotion process is activated to move the elements at the current level to a segment of lower rank. The rest of the code implements bookkeeping of the total values and the number of non-Void values in the segments. This, of course, means that the numbers of void elements in each segment are kept as metadata in an array V, where V[i] is the number of void elements in Segment i.

The demotion process used in the delete method is provided below:

```
def demote(i)
    s = S(i)
    t = T(i)
    arr = (active(i-1)? B:W)
    j = S(i-1)
    for (j= s; j <= t; j++)
        v = W[j]
        if (v != VOID)
            arr[j] = v
        end
        j = j+1
    end
end
```

Thus, the demote method receives the rank of a segment i as an argument. The method demote first finds the starting and ending indices of the segment. Depending on whether or not the segment with a rank lower by one is active or not, the method demote copies the non-VOID elements of the given segment to the lower-ranked segment of the white or black array. Note that if the copying is done over the black array, a merge process follows, as shown in the above code for the Delete method, FIG. 10 illustrates the delete process. A deletion of the value 59 takes place in segment of rank 3 (a); the number of non-VOID values in the segment after the deletion is decreased to half of for the points within each voxel the segment's length and a demotion is then invoked (b); since segment of rank 2 is active, the result of the operation demotion is put in black segment (c); a merge at rank 2 takes place, after which the values from the white and black segments of rank 2 reside in segment of rank 3 (d). Note that the value of VOID is denoted by φ in the example shown in FIG. 10.

Dynamic Data Repository Construction

In previous sections, a static data repository for a 3D space is built using the method Build(S) presented above in the section Data Repository. For applications using a dynamic data set, BWA is used so that points can be inserted and deleted dynamically from the data set. Given a point cloud S, the following method Build$^d$ constructs a BWA as a dynamic data repository:

```
Buid^d (S)
    n = size(S)
    BWA = InitializeBWA(n)
    for (i = 0; i < n, i++)
        (z, y, x) = S[i]
        k = H(z,y,x,w)
        BWA.insert(k)
    end
    return BWA
end
```

Unlike k-d tree, octree and other tree-based approaches, regional and neighborhood space searches in a 3D-space based on the DST transform avoid construction, traversal, and balancing of tree structures. The recursive decomposition works directly on the region with a time independent of the cardinality of the entire space. The precision of the DST-based search generally reaches a high level even with a shallow depth of recursive space decomposition and with a guaranteed recall of 100 percent. Testing of DST-based methods against other state-of-art methods with public 3D data sets and point clouds has demonstrated an order-of-magnitude improvement in speed over other current methods. The BWA data repository subsumes, in functionality, both static sorting methods, including merge-sort, and dynamic 1D search structures, including the red-black tree. The BWA data repository has the flexibility of building the repository incrementally, unlike merge sort, and avoids the cost of construction, maintenance and balancing of tree structures, unlike the red-black tree. The joint use of DST and BWA renders real-time processing of dynamic data sets in time-critical functional modules in sensing and control systems, including point cloud analysis, point-cloud registration, and object tracking for autonomous driving, achievable with reasonable computational resources.

Voxel Map

This section demonstrates how Dimensional Shuffle Transform (DST) is utilized to build a voxel map for a 3D space and support operations over the voxel map, which is a critical structure for point-cloud analysis found in many sensing and control system, such as autonomous vehicles and autonomous robots.

A voxel represents a unit volume in a given 3D space. FIG. 11 illustrates a voxel within a neighborhood of voxels. In FIG. 11, a central voxel is shown within a volume 1102 containing 26 additional voxels that represent a neighborhood of the central voxel. A voxel map is a 3D grid structure that encompasses the voxels in a space. Voxelization of a 3D space refers to a process of building a map for the space and assigning each point in the space to a corresponding voxel. A map is mutually exclusive if the intersection of any two voxels in the map results in the empty set. It is considered complete if every point in the 3D space is mapped to one and only one voxel. The map is considered regular when the edges of the voxels have equal lengths for any given level and each edge is parallel to one of the three axes. In currently disclosed implementations, the above-mentioned properties for the voxel maps are assumed throughout.

A complete voxel map is considered trimmed when it contains no empty voxels. This trimming ensures space efficiency, making the voxel map particularly suitable for LiDAR-generated point clouds that are often quite sparse. Additionally, a voxel map is termed recursive when each voxel can be further subdivided into eight smaller voxels with edge lengths half of the edge lengths of the subdivided voxel. In a recursive voxel map, each voxel is associated with a level that is one level lower than that of its parent voxel. The voxel map based on the Dimensional Shuffle Transform (DST) is both trimmed and naturally recursive.

Support for voxel mapping with the Dimensional Shuffle Transform (DST) is rooted in the inherent property of the DST transformed space, which is composed of a collection of perfect cubes as defined in the section Regions and Their Properties. It follows that a voxel of a given level can be uniquely identified by the LowerFt (lower front) and UpperBk(upper back) of the perfect cube corresponding to the voxel.

Voxel Map Operations

Voxel mapping finds application in a wide range of fields, including point-cloud analysis, tracking, simultaneous localization and mapping (SLAM), 3D rendering, and 3D modeling, often known under different names such as volumetric occupancy grid and OctoMap. While specific usage of voxel maps varies across applications, voxel maps support a common set of operations from a data-structure perspective. These shared operations include:

1. Build(S), which constructs a data repo of a voxel map for the space S.
2. Voxel (p, l), which locates the voxel of a specified level l that a given point p falls into by returning the lowerFt s and upperBk t of the voxel at level l.
3. VoxelSearch(s, t), which finds the points within a voxel identified by its two corners s and t.
4. Enumerate(Repo, l), which enumerates the non-empty voxels of level t in the data repository Repo for the voxel map.
5. 26 Neighborhood(s, t), which, given a voxel defined by two corners s and t, finds the regular region <u, v> consisting of the 26 neighboring voxels in the 3×3×3 voxel neighborhood with the given voxel positioned at the center (FIG. 11).
6. 26 NeighborVoxels(s,t), which, given a voxel defined by its two corners s and t finds the 26 neighboring voxels of the given voxel that surrounds the given voxel in the 3×3×3 block with the given voxel at the center.
7. Insert, which inserts a point (p) into the voxel map.
8. Delete, which removes a point from the voxel map.

These operations form a set of functionalities that are commonly supported by voxel maps, facilitating various operations and analyses for the mapped 3D space deployed in many sensing and control systems.

Depending on the application, a voxel map may not necessarily support all of the above-listed operations. Particularly, a voxel map without the insert and delete operations is referred to as static and is otherwise referred to as dynamic. The data Repo for a static voxel map is built exactly the same way as that for a static Data repository with the method Build(S) presented above in section Data Repository. For the dynamic voxel map, a black-white array (BWA) is used. The method to build the dynamic data repository with BWA under the name of Buid$^d$ (S) is provided in the section Dynamic Data Repository.

The operation Voxel(p,l) takes a point in the form of its DST key and a voxel level as arguments and returns the lowerFront and upperBk of the voxel of the specified level that contains the specified point. A voxel map built with DST implements the operation Voxel(p,l) as follows:

```
def Voxel(k, l)
    s = LowerFt(k, L)
    t = UpperBk(k, L)
    return (s,t)
end
```

The LowerFt and UpperBk are those defined in the section Region Decomposition.

The operation VoxelSearch(s,t) finds the points within a voxel defined by two corners s and t, which are the lowerFt and upperBk of the voxel:

```
def VoxelSearch(s,t)
    if (static map)
        result = Find(Repo, s,t)
    else
        result = Find^d(BWA,s,t)
    end
    return result
end
```

Depending on whether the map is dynamic or not, the Find operation is performed over a static Repo or a dynamic BWA, which are defined in the section Data Repository and the section Black-White Array Operations, respectively.

An enumeration of the voxels of a given level in a DST-based voxel map is provided by the operation Enumerate. In the case of a static voxel map, the data repo of the map is a sorted array and an enumeration of the voxels of level L is achieved by the following method:

```
def Enumerate(repo, L)
    voxels = { }
    n = size(repo)
    1 = 0
    while i < n
        k = repo [i]
        s = lowerFT(k,L)
        t = upperBk(k,L)
        voxels.push(<s,t>)
        while k <= t
            i++
        end
    end
    return voxels
end
```

The result is a list of the voxels of level L in the voxel map. Each voxel is identified by two corners, which define a perfect cube of level L.

Implementation of a method that enumerates the voxels of a specified level of a dynamic voxel map can incorporate the above code for static voxels. The data repository for the dynamic voxel map is a BWA array, which consists of a group of segments. Since the DST keys in each segment are sorted, each segment can be viewed as a static voxel map. The above Enumerate method can therefore be used to enumerate the voxels of a segment at a given level. The results from the multiple enumerations, one for each segment at one level, can then be merged with a deduplication procedure because a voxel might be found in more than one segment.

For a given voxel identified by two corners s and t, the voxel's 26 neighbors are the 26 voxels surrounding the voxel in a 3×3×3 voxel volume with the given voxel at the center (FIG. 11). The following method is to find the 3D regular region consisting of the given voxel together with the voxel's 26 neighbors:

```
def 26Neighborhood(s,t)
    L = level(s,t)
    (x_s, y_s, z_s) = H^{-1}(s)
    (x_t, y_t, z_t) = H^{-1}(t)
    k1 = H (zs−1, ys−1, xs−1, w)
    k2 = H (zs+1,ys+1, xs+1)
    u = LowerFt(k1, L)
    v = UpperBk(k2, L)
    return (u,v)
end
```

The result of this operation defines a regular region corresponding to the 26 neighborhood (See section Regions and Their Properties). Certain applications search for points in a 26 neighborhood. This can be achieved by using the cubical search. with the result returned by the above method as arguments, defined in the section Space Search Operations.

In some algorithms for point-cloud processing, the 26 neighboring voxels need to be each identified. The following method takes a voxel identified by two corners, and returns a collection of voxels that includes a specified voxel together with the voxel's 26 neighboring voxels:

```
def 26NeighborVoxels(s,t)
    (u,v) = 26Neighborhood(s,t)
    miniRepo = CubicalSearch(u,v,p)
    L = Lvl(u,v,w)
    VoxelsInNeighborhood = Enumerate(miniRepo,L)
    return VoxelsInNeighborhood
```

This method can use the Enumerate method to find the voxels of a specified level since the Enumerate method works for any sequence of DST keys provided that the DST keys are sorted and contained in a continuous section of a repository. The result returned by CubicalSearch indeed meets this condition.

Finally, a dynamic voxel map uses insert and delete operations. Since a black-white array is used for the data repo for a dynamic voxel map, the insert and delete operations of a dynamic voxel map reduce to no more than the Insert and Delete operations of the black-white array described in the section Black-White Array Operations.

Voxel Map for Real Application

An example of a DST-based voxel map that is used in solving real-world problems found in many autonomous sensing and control systems is provided in this section. In recent years, voxel-based algorithms for point-cloud analysis have been shown to be effective and more efficient than point-based approaches. The problems in point-cloud analysis for which a voxel-based approach is applicable include ground segmentation, down-sampling, denoising, simultaneous localization and mapping (SLAM), segmentation, target tracking with 3D occupancy grid, and many others.

The currently described example problem is point-cloud segmentation. Given a point cloud, a voxel-based segmentation identifies, for each object in the point cloud captured from the surrounding environment of a sensor, a unique set of voxels that encompass the points detected by Lidar from the object. The result of segmentation separates objects in a scene and defines object boundaries. This result not only facilitates identification of objects on a road, but also provides a basis for further point-cloud-analysis procedures including semantic segmentation, tracking of moving objects, feature extraction for machine learning, and others.

A method that performs a point-cloud segmentation using a DST-based voxel map is provided below:

```
def Segmentation (S, L)
   repo = Build(S)
   voxels = enumerate(repo, L)
   m = NumberOf(voxels)
   labels = [ ]
   Dict = [ ] # dictionary of (voxel, label) pairs
   label = 1
   i = 0
   while i < m
      Labeled = False
      LabelUsed = ∞
      (s,t) = voxels [i]
      Neighbors = 26NeighborVoxels(s, t)
      for (j = 0; i < 27; i++)
         nbr = Neighbors(j)
         nbrLabel = Dict(nbr)
         if (nbrLabel != Nil)
            if (Labeled = False)
               Dict.add(voxels[i], neighborLabel)
            If (Labeled = True)
               lbl = Min(Dict(nbr), Dict(voxels[i])
               Dict.add(voxel[i], Ibl)
               lbl2 = Max(Dict(nbr, Dict
               List = Dict.byValue(Ibl2)
               for (each voxel in List)
                  Dict.update(voxel) = Ibl
               end
            end
         end
         if (Labeled = False)
            label = label+1
            Dict.add (voxels[i], label)
         end
      end
      i = i+1
   end
   return Dictionary
end
```

This segmentation method takes a point cloud S and a level for voxelization as arguments. This segmentation method first builds a data repository for the voxel map using a DST transform and then enumerates the voxels of a specified level L. Initially, none of the voxels are labeled. Then, each voxel in the list returned from voxel enumeration is examined by checking its 26 neighboring voxels. When a neighboring voxel is labeled before a voxel is labeled, the unlabeled voxel receives the label of the neighboring voxel and is marked as labeled. When both a voxel and a neighboring voxel in the 26-voxel neighborhood are labeled, both the voxel and the voxel's neighbor receive the label of lower value of the two labels. The voxels with the higher label between the two labels also receive the label of the lower value. Here, a dictionary of the ((s,t), label) pairs is used to facilitate the retrieval of the voxels with a given label. The result returned by this Segmentation method is a final dictionary which associates each voxel in the Voxel Map with a label at a unique object which contains the voxel.

The result of the segmentation method therefore includes information about each object, including the object's constituent voxels and the object's boundaries as defined collectively by the object's constituent voxels. Segmentation serves the purpose, in object detection, of generating bounding boxes, target tracking, obstacle avoidance, motion planning, and voxel feature extraction for the purpose of training of neural networks.

FIG. 12 illustrates a segmentation process that uses a DST-based voxel map. A plot of raw point cloud 1202 to be segmented is first shown. A second plot of a voxelization of the point cloud 1204 is next shown in FIG. 12. Finally, a result of the segmentation process is shown in plot 1206. Segmentation resolves the undifferentiated set of point-containing voxels shown in plot 1204 into two clusters of voxels 1206, colored in white and black respectively, that correspond to two different objects.

The above discussed spatial transformations, decomposition methods, searching methods, and voxel-based operations are used in many different systems and devices that sense environments and that control objects, devices, systems, or other entities identified within the environments, including vehicles equipped for autonomous driving, robots, medical instrumentation, and many other types of systems and devices. Control may involve positioning a system or device in the environment relative to the determined location of an identified object, applying a force to an identified object, and directing an electromagnetic signal to an identified object. The data points discussed in the current document, often referred to as "points," may include, in addition to spatial coordinates or keys, additional values for additional attributes. The present invention has been described in terms of particular embodiments, it is not intended that the invention be limited to these embodiments. Modifications within the spirit of the invention will be apparent to those skilled in the art. For example, any of many different implementations of the currently disclosed methods and systems can be obtained by varying various design and implementation parameters, including modular organization, control structures, data structures, hardware, operating system, and virtualization layers, automated orchestration systems, virtualization-aggregation systems, and other such design and implementation parameters.

The invention claimed is:

1. A control system comprising:
   one or more computer systems, each including one or more processors and one or more memory subsystems; and
   processor instructions, stored in one or more of the one or more memories, that, when executed by one or more of the one or more processors, control the control system to
      receive three-dimensional data collected from an external environmental volume comprising three-dimensional data points with environmental locations, the environmental location of a three-dimensional data point represented by an ordered tuple of three three-dimensional-coordinate values, the three-dimensional data defining a three-dimensional space S,
      apply a three-dimensional-space-to-one-dimensional-space transform to the three-dimensional data to generate corresponding one-dimensional data comprising one-dimensional data points, each one-dimensional data point represented by a key comprising an ordered set of fields, an ordered set containing the corresponding one-dimensional data points, each represented by a key, defining a hierarchically structured one-dimensional space L containing one-dimensional data points, wherein local spatial three-dimensional neighborhoods of three-dimensional data points in the received three-dimensional data correspond to local one-dimensional neighborhoods of one-dimensional data points in the one-dimensional space L and wherein the three-dimensional space S corresponds to a voxelated three-dimensional space S containing one or more levels of voxels, each voxel in each of the one or more levels corresponding to a sequence of adjacent three-dimensional data points in the one-dimensional space L,
      identify a set of one-dimensional data points by searching for data points in the one-dimensional data, apply a one-dimensional-space-to-three-dimensional-space reverse transform to the identified set of one-dimensional data points to generate a corresponding set of three-dimensional data points,
determine, from the set of three-dimensional data points, the location of an object in the external environmental volume, and
control the external environment by one or more of
positioning a system or device in the external environment relative to the determined location of the object,
applying a force to the object, and
directing an electromagnetic signal to the object.

2. The control system of claim 1 wherein searching for data points in the one-dimensional data further comprises searching for data points in the one-dimensional data that meet one of:
a specified criterion; and
a specified set of criteria.

3. The control system of claim 1 wherein searching for data points in the three-dimensional data further comprises three different types of searching:
cubical searching, which finds the three-dimensional data points contained in a specified unit volume of the three-dimensional space S;
radius searching, which finds the three-dimensional data points contained in a spherical volume of the three-dimensional space S specified by a radius and a central point; and
k-nearest-neighbor searching, which finds the three-dimensional data points closest in three-dimensional space to a specified three-dimensional data point.

4. The control system of claim 1
wherein each of the three-dimensional-coordinates values that together represent the environmental location of a data point in the three-dimensional data is represented by an unsigned integer with a binary encoding comprising a number w of ordered bits; and
wherein the key to which the three-dimensional-coordinates values that together represent an environmental location of a data point is transformed contains w fields, each field containing three bits, with the w fields ordered from a lowest field position 0, corresponding to the least significant bit in the number w of ordered bits, to a highest field position w−1 corresponding to the most significant bit in the number w of ordered bits.

5. The control system of claim 4 wherein the three-dimensional-space-to-one-dimensional-space transform transforms a three-dimensional data point p to a key k by:
for each coordinate value v of the three coordinate values in the ordered tuple of three three-dimensional-coordinate values that represent three-dimensional data point p,
for each bit with position t within the w ordered bits of the three-dimensional-coordinate value v,
setting the value of a bit in a position corresponding to three-dimensional-coordinate value v in a field of the key k corresponding to bit position t to the value of the bit with position t within the w ordered bits of the three-dimensional-coordinate value v.

6. The control system of claim 4 wherein the one-dimensional-space-to-three-dimensional-space reverse transform reverse transforms a key k to a three-dimensional data point p by:
for each field f in the key k,
for each bit b in field f,
selecting a three-dimensional-coordinate value v in three-dimensional data point p corresponding to bit b;
selecting a bit in the selected three-dimensional-coordinate value v corresponding to the field f; and
setting the selected bit to the value of the bit b.

7. The control system of claim 3 wherein two three-dimensional data points $p_1$ and $p_2$ selected from the three-dimensional space S define a regular region in the three-dimensional space S and the two one-dimensional data points $k_1$ and $k_2$ corresponding to data points $p_1$ and $p_2$ define a corresponding linear region in one-dimensional space L.

8. The control system of claim 7
wherein the precision of a region is equal to the number of data points in the corresponding regular region divided by the number of data points in the corresponding linear region;
wherein the maximum precision of a region is the precision of the corresponding regular region containing the same number of data points as contained in the corresponding linear region;
wherein the precision of a regular region is less than or equal to the maximum precision;
wherein a regular region with a precision equal to the maximum precision is a perfect region;
wherein a regular region that is not a perfect region is a non-perfect region; and
wherein, when a perfect region has edges of equal lengths in three dimensions, the perfect region is a prefect unit region.

9. The control system of claim 8
wherein each regular region and corresponding linear region is associated with a level; and
wherein the level of a regular region and corresponding linear region, defined by two different keys $k_1$ and $k_2$, corresponds to the highest field position, within keys $k_1$ and $k_2$, at which two corresponding fields in keys $k_1$ and $k_2$ differ, with the level ranging from 0 to w−1.

10. The control system of claim 9 further comprising:
a non-recursive decomposer that decomposes a non-perfect region with a first volume, first precision, and first level into two or more regular regions with smaller volumes than the first volume, with precisions greater than or equal to the first precision, and with associated levels less than the first level; and
a recursive decomposer that recursively decomposes a non-perfect region with a first volume, first precision, and first level into two or more regular regions with smaller volumes than the first volume, with precisions greater than or equal to a specified precision, and levels less than the first level.

11. The control system of claim 9 wherein the three-dimensional space S is recursively voxelated into voxel levels corresponding to the possible voxel levels 0 through w−1 associated with perfect regions.

12. The control system of claim 11 further including a containing-region identifier that identifies a voxel at a specified level lvl containing a data point p in S having a corresponding key k in L, the identified voxel represented by a pair of keys $k_1$ and $k_2$, by:
setting fields having positions in k less than lvl to contain all 0 bits to generate $k_1$; and
setting fields having positions in k greater than or equal to lvl to contain all 0 bits to generate $k_2$.

13. The control system of claim 11 further including a data-point enumerator that finds the data points in S within a voxel represented by a pair of keys $k_1$ and $k_2$ by:
  retrieving the keys from L greater than or equal to $k_1$ and less than or equal to $k_2$; and
  employing the one-dimensional-space-to-three-dimensional-space reverse transform to reverse transform the retrieved keys to three-dimensional data points.

14. The control system of claim 11 further including a voxel enumerator that finds voxels at a specified level lvl containing data points in S by invoking, for each data point in S, the containing-region identifier with specified level lvl.

15. The control system of claim 11 further including a voxel-neighborhood finder that finds the voxel neighborhood of a voxel specified by a pair of keys $k_1$ and $k_2$, with key $k_1$ less than key $k_2$, by:
  determining the level associated with the specified voxel;
  employing the one-dimensional-space-to-three-dimensional-space reverse transform to reverse transform keys $k_1$ and $k_2$ to corresponding three-dimensional data points $p_1$ and $p_2$ that define a first volume in S;
  generating three-dimensional data point $p_3$ with three-dimensional coordinate values one less than the three-dimensional coordinate values of three-dimensional data point $p_1$;
  generating three-dimensional data point $p_4$ with three-dimensional coordinate values one greater than the three-dimensional coordinate values of three-dimensional data point $p_2$; and
  applying the one-dimensional-space-to-three-dimensional-space transform to transform data points $p_3$ and $p_4$ to keys $k_3$ and $k_4$;
  setting fields having positions in $k_3$ less than lvl to contain all 0 bits to generate $k_5$;
  setting fields having positions in $k_3$ greater than or equal to lvl to contain all 0 bits to generate $k_6$; and
  returning $k_5$ and $k_6$ as the definition of a neighborhood that includes the specified voxel.

16. The control system of claim 1 wherein the control system represents one or more sets of one-dimensional data points by one of:
  a data structure storing an ordered sequence of keys; and
  a black-white-array data structure that stores an ordered sequence of keys.

17. A method that identifies an object in a three-dimensional environment using three-dimensional data collected from the three-dimensional environment, the method comprising:
  receiving three-dimensional data comprising three-dimensional data points with environmental locations, the environmental location of a three-dimensional data point represented by an ordered tuple of three three-dimensional-coordinate values, the three-dimensional data defining a three-dimensional space S,
  applying a three-dimensional-space-to-one-dimensional-space transform to the three-dimensional data to generate corresponding one-dimensional data comprising one-dimensional data points, each one-dimensional data point represented by a key comprising an ordered set of fields, an ordered set containing the corresponding one-dimensional data points, each represented by a key, defining a hierarchically structured one-dimensional space L containing one-dimensional data points, wherein local spatial three-dimensional neighborhoods of three-dimensional data points in the received three-dimensional data correspond to local one-dimensional neighborhoods of one-dimensional data points in the one-dimensional space L and wherein the three-dimensional space S corresponds to a voxelated three-dimensional space S containing one or more levels of voxels, each voxel in each of the one or more levels corresponding to a sequence of adjacent three-dimensional data points in the one-dimensional space L,
  identifying a set of one-dimensional data points by searching for data points in the one-dimensional data,
  applying a one-dimensional-space-to-three-dimensional-space reverse transform to the identified set of one-dimensional data points to generate a corresponding set of three-dimensional data points,
  determining, from the set of three-dimensional data points, the location of an object in the external environmental volume.

18. The method of claim 1 wherein searching for data points in the one-dimensional data further comprises searching for data points in the one-dimensional data that meet one of:
  a specified criterion; and
  a specified set of criteria.

19. The method of claim 17 wherein searching for data points in the three-dimensional data further comprises three different types of searching:
  cubical searching, which finds the three-dimensional data points contained in a specified unit volume of the three-dimensional space S;
  radius searching, which finds the three-dimensional data points contained in a spherical volume of the three-dimensional space S specified by a radius and a central point; and
  k-nearest-neighbor searching, which finds the three-dimensional data points closest in three-dimensional space to a specified three-dimensional data point.

20. The method of claim 17
  wherein each of the three-dimensional-coordinates values that together represent the environmental location of a data point in the three-dimensional data is represented by an integer with a binary encoding comprising a number w of ordered bits; and
  wherein the key to which the three-dimensional-coordinates values that together represent an environmental location of a data point is transformed contains w fields, each field containing three bits, with the w fields ordered from a lowest field position 0, corresponding to the least significant bit in the number w of ordered bits, to a highest field position w−1 corresponding to the most significant bit in the number w of ordered bits.

21. The method of claim 20 wherein the three-dimensional-space-to-one-dimensional-space transform transforms a three-dimensional data point p to a key k by:
  for each coordinate value v of the three coordinate values in the ordered tuple of three three-dimensional-coordinate values that represent three-dimensional data point p,
    for each bit with position t within the w ordered bits of the three-dimensional-coordinate value v,
      setting the value of a bit in a position corresponding to three-dimensional-coordinate value v in a field of the key k corresponding to bit position t to the value of the bit with position t within the w ordered bits of the three-dimensional-coordinate value v.

22. The method of claim 20 wherein the one-dimensional-space-to-three-dimensional-space reverse transform reverse transforms a key k to a three-dimensional data point p by:
  for each field f in the key k, for each bit b in field f,
   selecting a three-dimensional-coordinate value v in three-dimensional data point p corresponding to bit b;
   selecting a bit in the selected three-dimensional-coordinate value v corresponding to the field f; and
   setting the selected bit to the value of the bit b.

23. The method of claim 20 wherein two three-dimensional data points $p_1$ and $p_2$ selected from the three-dimensional space S define a regular region in the three-dimensional space S and the two one-dimensional data points $k_1$ and $k_2$ corresponding to data points $p_1$ and $p_2$ define a corresponding linear region in one-dimensional space L.

24. The method of claim 23
wherein the precision of a region is equal to the number of data points in the corresponding regular region divided by the number of data points in the corresponding linear region;
wherein the maximum precision of a region is the precision of the corresponding regular region containing the same number of data points as contained in the corresponding linear region;
wherein the precision of a regular region is less than or equal to the maximum precision;
wherein a regular region with a precision equal to the maximum precision is a perfect region;
wherein a regular region that is not a perfect region is a non-perfect region; and
wherein, when a perfect region has edges of equal lengths in three dimensions, the perfect region is a prefect unit region.

25. The method of claim 24
wherein each regular region and corresponding linear region is associated with a level; and
wherein the level of a regular region and corresponding linear region, defined by two different keys $k_1$ and $k_2$, corresponds to the highest field position, within keys $k_1$ and $k_2$, at which two corresponding fields in keys $k_1$ and $k_2$ differ, with the level ranging from 0 to w−1.

26. The method of claim 25 further comprising:
decomposing a non-perfect region with a first volume, first precision, and first level into two or more regular regions with smaller volumes than the first volume, with precisions greater than or equal to the first precision, and with associated levels less than the first level; and
recursively decomposing a non-perfect region with a first volume, first precision, and first level into two or more regular regions with smaller volumes than the first volume, with precisions greater than or equal to a specified precision, and levels less than the first level.

27. The method of claim 26 wherein the three-dimensional space S is recursively voxelated into voxel levels corresponding to the possible voxel levels 0 through w−1 associated with perfect regions.

28. The method of claim 27 further including a containing-region identifier that identifies a voxel at a specified level lvl containing a data point p in S having a corresponding key k in L, the identified voxel represented by a pair of keys $k_1$ and $k_2$, by:
setting fields having positions in k less than lvl to contain all 0 bits to generate $k_1$; and
setting fields having positions in k greater than or equal to lvl to contain all 0 bits to generate $k_2$.

29. The method of claim 27 further including finding the data points in S within a voxel represented by a pair of keys $k_1$ and $k_2$ by:
retrieving the keys from L greater than or equal to $k_1$ and less than or equal to $k_2$; and
employing the one-dimensional-space-to-three-dimensional-space reverse transform to reverse transform the retrieved keys to three-dimensional data points.

30. The method of claim 27 further including a finding voxels at a specified level lvl containing data points in S by invoking, for each data point in S, the containing-region identifier with specified level lvl.

31. The control system of claim 27 further including finding the voxel neighborhood of a voxel specified by a pair of keys $k_1$ and $k_2$, with key $k_1$ less than key $k_2$, by:
determining the level associated with the specified voxel;
employing the one-dimensional-space-to-three-dimensional-space reverse transform to reverse transform keys $k_1$ and $k_2$ to corresponding three-dimensional data points $p_1$ and $p_2$ that define a first volume in S;
generating three-dimensional data point $p_3$ with three-dimensional coordinate values one less than the three-dimensional coordinate values of three-dimensional data point $p_1$;
generating three-dimensional data point $p_4$ with three-dimensional coordinate values one greater than the three-dimensional coordinate values of three-dimensional data point $p_2$; and
applying the one-dimensional-space-to-three-dimensional-space transform to transform data points $p_3$ and $p_4$ to keys $k_3$ and $k_4$;
setting fields having positions in $k_3$ less than lvl to contain all 0 bits to generate $k_5$;
setting fields having positions in $k_3$ greater than or equal to lvl to contain all 0 bits to generate $k_6$; and
returning $k_5$ and $k_6$ as the definition of a neighborhood that includes the specified voxel.

32. The method of claim 17 wherein one or more sets of one-dimensional data points are represented by one of:
a data structure storing an ordered sequence of keys; and
a black-white-array data structure that stores an ordered sequence of keys.

* * * * *